United States Patent [19]

Tubel et al.

[11] Patent Number: 5,839,508
[45] Date of Patent: *Nov. 24, 1998

[54] DOWNHOLE APPARATUS FOR GENERATING ELECTRICAL POWER IN A WELL

[75] Inventors: Paulo Tubel, The Woodlands; Michael Wayne Holcombe, Katy; John L. Baugh, Houston; Albert A. Mullins, II, Humble, all of Tex.; Robert Chapman Ross, Newmachar, Scotland

[73] Assignee: Baker Hughes Incorporated, Houston, Tex.

[*] Notice: The term of this patent shall not extend beyond the expiration date of Pat. No. 5,597,042.

[21] Appl. No.: 668,053

[22] Filed: Jun. 19, 1996

Related U.S. Application Data

[63] Continuation-in-part of Ser. No. 386,480, Feb. 9, 1995, Pat. No. 5,597,042.
[60] Provisional application No. 60/000,469 Jun. 23, 1995.

[51] Int. Cl.[6] ..................................................... E21B 43/00
[52] U.S. Cl. .......................................... 166/65.1; 116/66.5
[58] Field of Search ...................... 290/54, 43; 166/65.1, 166/66.5, 250.11, 250.15, 117.5, 117.6

[56] References Cited

U.S. PATENT DOCUMENTS

| | | |
|---|---|---|
| 2,380,520 | 7/1945 | Hassler . |
| 2,944,603 | 7/1960 | Baker et al. . |
| 3,036,645 | 5/1962 | Rowley . |
| 3,280,923 | 10/1966 | Muench . |
| 3,342,267 | 9/1967 | Cotter et al. . |
| 3,448,305 | 6/1969 | Raynal et al. . |
| 3,666,030 | 5/1972 | Bohn et al. . |
| 3,822,589 | 7/1974 | Le Peuvedic et al. . |
| 3,876,471 | 4/1975 | Jones . |
| 3,970,877 | 7/1976 | Russell et al. . |
| 4,051,909 | 10/1977 | Baum . |
| 4,132,269 | 1/1979 | Chasteen . |
| 4,147,223 | 4/1979 | Patton . |
| 4,184,545 | 1/1980 | Claycomb . |
| 4,248,305 | 2/1981 | Scarbrough et al. . |
| 4,407,374 | 10/1983 | Wallussek et al. . |
| 4,415,823 | 11/1983 | Jürgens . |
| 4,416,000 | 11/1983 | Scherbatskoy . |
| 4,491,738 | 1/1985 | Kamp . |
| 4,515,225 | 5/1985 | Dailey . |
| 4,518,888 | 5/1985 | Zabcik . |
| 4,520,468 | 5/1985 | Scherbatskoy . |
| 4,532,614 | 7/1985 | Peppers . |
| 4,535,429 | 8/1985 | Russell et al. . |
| 4,562,560 | 12/1985 | Kamp . |
| 4,578,675 | 3/1986 | MacLeod . |

(List continued on next page.)

FOREIGN PATENT DOCUMENTS

| | | |
|---|---|---|
| 0 295 178 | 12/1988 | European Pat. Off. . |
| 0 486 751 A1 | 5/1992 | European Pat. Off. . |
| 1 538 579 | 1/1979 | United Kingdom . |
| 2 087 951 | 6/1982 | United Kingdom . |
| 2 137 260 | 10/1984 | United Kingdom . |
| 2 266 546 | 11/1993 | United Kingdom . |
| WO 93/08368 | 4/1993 | WIPO . |

*Primary Examiner*—William P. Neuder
*Attorney, Agent, or Firm*—Fishman, Dionne, Cantor & Colburn

[57] ABSTRACT

Electrical generating apparatus is provided which connects to the production tubing. In a preferred embodiment, this apparatus includes a housing having a primary flow passageway in communication with the production tubing. The housing also includes a laterally displaced side passageway communicating with the primary flow passageway such that production fluid passes upwardly towards the surface through the primary and side passageways. A flow diverter may be positioned in the housing to divert a variable amount of production fluid from the production tubing and into the side passageway. In accordance with an important feature of this invention, an electrical generator is located at least partially in or along the side passageway. The electrical generator generates electricity through the interaction of the flowing production fluid.

54 Claims, 18 Drawing Sheets

U.S. PATENT DOCUMENTS

| | | |
|---|---|---|
| 4,624,136 | 11/1986 | Delatorre et al. . |
| 4,636,995 | 1/1987 | Russell et al. . |
| 4,647,853 | 3/1987 | Cobern . |
| 4,675,259 | 6/1987 | Totty . |
| 4,714,403 | 12/1987 | Russell et al. . |
| 4,725,197 | 2/1988 | Russell et al. . |
| 4,732,225 | 3/1988 | Jurgens et al. . |
| 4,805,407 | 2/1989 | Buchanan . |
| 4,852,648 | 8/1989 | Akkerman et al. . |
| 5,094,103 | 3/1992 | Wicks, III et al. . |
| 5,149,984 | 9/1992 | Schultz et al. . |
| 5,181,566 | 1/1993 | Barneck ............... 166/117.5 |
| 5,202,194 | 4/1993 | VanBerg, Jr. . |
| 5,237,857 | 8/1993 | Dobson et al. . |
| 5,248,896 | 9/1993 | Forrest . |
| 5,265,682 | 11/1993 | Russell et al. . |
| 5,269,383 | 12/1993 | Forrest . |
| 5,285,204 | 2/1994 | Sas-Jaworsky . |
| 5,455,573 | 10/1995 | Delatorre ............ 166/250.11 |
| 5,597,042 | 1/1997 | Tubel et al. ........... 166/250.15 | ns
DOWNHOLE APPARATUS FOR GENERATING ELECTRICAL POWER IN A WELL

CROSS REFERENCE TO RELATED APPLICATIONS

This application claims the benefit of U.S. Provisional application Ser. No. 60/000,469, filed Jun. 23, 1995 and this application is a continuation-in-part of Ser. No. 08/386,480 filed Feb. 9, 1995, now U.S. Pat. No. 5,597,042.

BACKGROUND OF THE INVENTION

This invention relates to apparatus and methods for providing electrical power to electrical circuits located in a well. More particularly, this invention relates to downhole apparatus and methods for producing electrical power in oil and gas production wells wherein the primary wellbore passage is maintained free of obstruction.

The control of oil and gas production wells constitutes an important and on-going concern of the petroleum industry. Production well control has become particularly important and more complex in view of the industry wide recognition that wells having multiple branches (i.e., multilateral wells) will be increasingly important and commonplace. Such multilateral wells include discrete production zones which produce fluid in either common or discrete production tubing. In either case, there is a need for controlling zone production, isolating specific zones and otherwise monitoring each zone in a particular well. As a result, the methods and apparatus for controlling wells are growing more complex and in particular, there is an ever increasing need for downhole control systems which include downhole computerized modules employing downhole computers (e.g., microprocessors) for commanding downhole tools such as packers, sliding sleeves and valves. An example of such a sophisticated downhole control system is disclosed in U.S. Patent application Ser. No. 08/385,992 filed Feb. 9, 1995, which is assigned to the assignee hereof and incorporated herein by reference. This application discloses downhole sensors, downhole electromechanical devices and downhole computerized control electronics whereby the control electronics automatically control the electromechanical devices based on input from the downhole sensors. Thus, using the downhole sensors, the downhole computerized control system will monitor actual downhole parameters (such as pressure, temperature, flow, gas influx, etc.) and automatically execute control instructions when the monitored downhole parameters are outside a selected operating range (e.g., indicating an unsafe condition). The automatic control instructions will then cause an electromechanical control device (such as a valve) to actuate a suitable tool (for example, actuate a sliding sleeve or packer, or close a valve or start/stop a pump or other fluid flow device).

It will be appreciated that the above-described well control system as well as other well control systems utilize downhole devices and circuits which require electrical power. However, presently known methods of supplying or generating electricity downhole each suffers from a host of problems and deficiencies.

One manner of providing electricity downhole in a well includes lowering a tool on a wireline and conducting energizing electricity through one or more conductors in the wireline from the surface to the tool when positioned downhole. This technique is not always desirable because it is relatively complex in that it requires the wireline to be passed through the wellhead closure equipment at the mouth of the well. This can create safety problems. Furthermore, at least in deep wells, there can be significant energy loss caused by the resistance or impedance of a long wireline conductor.

Another way to provide electricity to downhole electrical circuits utilizes batteries housed within the electrical circuits in the downhole assembly. For example, lithium-thionyl-chloride batteries have been used with downhole tools. A shortcoming of batteries, however, is that they cannot provide moderate (and higher) amounts of electrical energy (e.g., 30 kilowatt-hours) at the elevated temperatures encountered in petroleum and geothermal wells. Batteries are also extremely dangerous. Still another problem with batteries are their relatively short life whereupon the batteries need to be replaced and/or recharged.

Because of the shortcomings of power derived either from wireline or battery sources, suggestions have been made to provide a downhole mechanism which continuously generates and supplies electricity. For example, U.S. Pat. No. 4,805,407 to Buchanan discloses a downhole electrical generator/power supply which includes a housing in which a primary fuel source, a Stirling cycle engine, and a linear alternator are disposed. The primary fuel source includes a radioisotope which, by its radioactive decay, provides heat to operate the Stirling engine which in turn drives the linear alternator to provide a suitable electrical output for use by the circuit of the downhole tool. U.S. Pat. No. 5,202,194 to VanBerg Jr. discloses a downhole power supply comprised of a fuel cell.

U.S. Pat. Nos. 3,970,877 ('877) and 4,518,888 ('888) both relate to the use of piezoelectric techniques for generating small electric currents. The '888 patent generates electrical energy downhole (in the drillstring) by the use of a piezoelectric device stored in the drill collar which converts vibrational energy from the drillstring into electrical energy. The piezoelectric device is in the form of a stack of piezoelectric elements arranged in an electrically additive configuration. The '877 patent describes a method of power generation used in a drilling operation wherein a piezoelectric material is responsive to turbulence in the mud flowing past the piezoelectric material. The vibrations resulting from the turbulent flow of the mud past the piezoelectric material will be converted into an electrical output. In addition to a piezoelectric material, the '877 patent also discloses the use of a fixed coil with a magnetic core freely movable relative to the coil and attached to the inner surface of a flexible disk which will also be actuated by the flowing mud for generation of electrical energy.

U.S. Pat. No. 3,666,030 ('030) discloses a stressed spring or other form of stored energy which is carried downhole and is then converted to electrical energy by causing relative motion between a permanent magnet and coil and some other structure which is urged into movement by the compressed spring. In the '030 patent, the energizing source comprises a housing which is adapted to traverse a borehole. A magnetic coil is positioned within the housing and the storage means for storing energy (i.e., spring) is also positioned in the housing. A release mechanism located in the housing releases the stored energy at the proper moment downhole so that the electrical energy can be generated.

U.S. Pat. No. 3,342,267 ('267) to Cotter et al discloses downhole production tubing including an electric generator which is energized by a turbine for providing electricity to a coiled heater which is also disposed in the production tubing. The turbine rotates upon the upward flow of fluids in the production tubing. In FIG. 2 of the '267 patent, a primary production tubing is shown at 12, a coiled heater is shown at 24 and downstream from the coiled heater is a series of rotatable turbines 26. Disposed laterally from production turbine 12 is a side compartment 38 which houses the electrical generator 20. During operation, production fluid flows upwardly through production tubing 12 thereby rotating turbines 26 which in turn, through a series of gearings, will rotate generator 20 in the side compartment 38 and thereby generate electricity to power the heating coil 24.

The numerous attempts at generating electricity downhole in a well as disclosed in the aforementioned patents all suffer from one or more drawbacks and problems including, for example, environmental and safety concerns (e.g., U.S. Pat. No. 4,805,407), high expense and complexity (e.g., U.S. Pat. No. 5,202,194), inability to generate high or sustained levels of power (e.g., U.S. Pat. Nos. 3,666,030; 3,970,877; 4,518,888) and causing obstructions within the production tubing (e.g., U.S. Pat. No. 3,342,267). This latter problem, that of obstructing the production tubing, poses a serious drawback to many prior art schemes. In the '267 patent, for example, the turbine blades are positioned in the primary production tubing and thus would preclude unobstructed production as is required, particularly so as to enable entry of completion equipment and other objects into the production tubing. Thus, the turbo generator of the '267 patent would not allow for the downhole introduction of instruments, tools and other completion devices due to the presence of turbines.

Such obstruction problems are also an important reason why well known turbo generators used in generating electricity during drilling operations (e.g., for powering MWD equipment) would be problematic when used in a production well. Examples of patents describing downhole turbo generators used during drilling include U.S. Pat. Nos. 3,036,645 and 4,647,853.

SUMMARY OF THE INVENTION

The above-described and other drawbacks and deficiencies of the prior art are overcome or alleviated by the downhole electrical generating apparatus and methods of the present invention. In accordance with the present invention, electrical generating apparatus is provided which connects to the production tubing. This apparatus includes a housing having a primary flow passageway in communication with the production tubing. In a first embodiment of this invention, the housing also includes a laterally displaced side passageway communicating with the primary flow passageway such that production fluid passes upwardly towards the surface through the primary and side passageways. A flow diverter may be positioned in the housing to divert a variable amount of production fluid from the production tubing and into the side passageway. Alternatively, production fluid may enter the side passageway from the annulus defined by the production tubing and the borehole wall or casing.

In accordance with an important feature of this invention, an electrical generating device is located in or along the side passageway. The electrical generating device generates electricity through the interaction of the flowing production fluid. In a first embodiment of this invention, a turbine or the like is operatively connected within the side passageway for movement in response to fluid flowing through the side passageway. A generator is also positioned in the side passageway and is operatively connected to the turbine for generating electricity in response to movement by the turbine. In a second embodiment of this invention, a magnetic field is positioned in the side passageway with the magnetic field being movable in response to fluid flowing the side passageway (such as an oscillating magnetic reed enclosed by a coil). An electrical energy converter in the side passageway converts the AC power created by the movable magnetic field into DC electrical energy.

In a third embodiment of this invention, a movable magnetic field within the side passageway is effected by positioning magnets on a movable bladder which is sandwiched between a pair of coils. Fluid is directed through the bladder such that the magnets move with respect to the coils thereby generating electricity. Preferably, a turbulence enhancer is positioned upstream of the bladder to cause a turbulent and constant movement of the fluid within the bladder. In a fourth embodiment, the electrical generating device in the side passageway constitutes a piezoelectric power supply wherein a piezoelectric assembly generates electrical power in response to fluid flow.

In accordance with another embodiment of this invention, pressure waves are delivered downhole through a column of fluid to actuate an electrical generating device to thereby generate electricity. In one such embodiment, the pressure waves travel through the production tubing and cause a laterally mounted spring actuated magnet/coil assembly to move in a reciprocal motion and thus generate electricity. In another such embodiment, the pressure waves travel downwardly through a separate control line to actuate the laterally mounted or annulus mounted magnet/coil assembly to reciprocate and generate power.

In still another embodiment of this invention, various electrical energy generating devices are positioned in the annulus adjacent the production tubing and generate electricity in response to fluid flowing either from the production tubing or within the annulus itself. In one such embodiment, the electrical generating device comprises a turbine rotatably mounted about the outer circumference of the production tubing. Attached to the turbine is one or more magnets. Also attached to the outer circumference of the production tubing and in spaced, facing relation to the magnet is a coil. During use, production fluid flowing from the annulus or from within the production tubing out to the annulus, will flow past the turbine causing the turbine and attached magnet(s) to freely rotate about the tubing. The rotating magnet will interact with the coil in a known manner to generate electricity.

Preferably, in each of the foregoing embodiments, a rechargeable battery may also be present in the side passageway with the electrical generator being operatively connected to the battery for electrically charging the battery. As a result, an electrical circuit such as a downhole computer can be provided with electricity either directly from the generator or from the battery. Since many of the electrical generator techniques of this invention necessitate the flow of production fluid, provision of a battery is particularly important for those periods where the flow of production fluids has halted or significantly slowed.

A particularly preferred rechargeable battery for use in the downhole power generation apparatus of this invention is a lithium power cell (LPC) using polymer electrolytes. Also believed to be preferred is a rechargeable battery which incorporates integrated circuit technology for maximizing battery life.

The downhole electrical generating methods and apparatus of the present invention provide many features and advantages over prior art techniques. One important feature is that the components which generate the electricity are outside of the primary passageway defined by the production tubing. As a result, the present invention does not in any way obstruct the production tubing (as does for example, the turbo generator of U.S. Pat. No. 3,342,267). This means that completion equipment, coiled tubing and other objects may be freely introduced downhole. The present invention also provides environmentally acceptable, relatively low cost processes and apparatus for downhole electrical generation.

The above-discussed and other features and advantages of the present invention will be appreciated and understood by those skilled in the art from the following detailed description and drawings.

BRIEF DESCRIPTION OF THE DRAWINGS

Referring now to the drawings, wherein like elements are numbered alike in the several FIGURES.

DESCRIPTION OF THE PREFERRED EMBODIMENT

Figure 1:
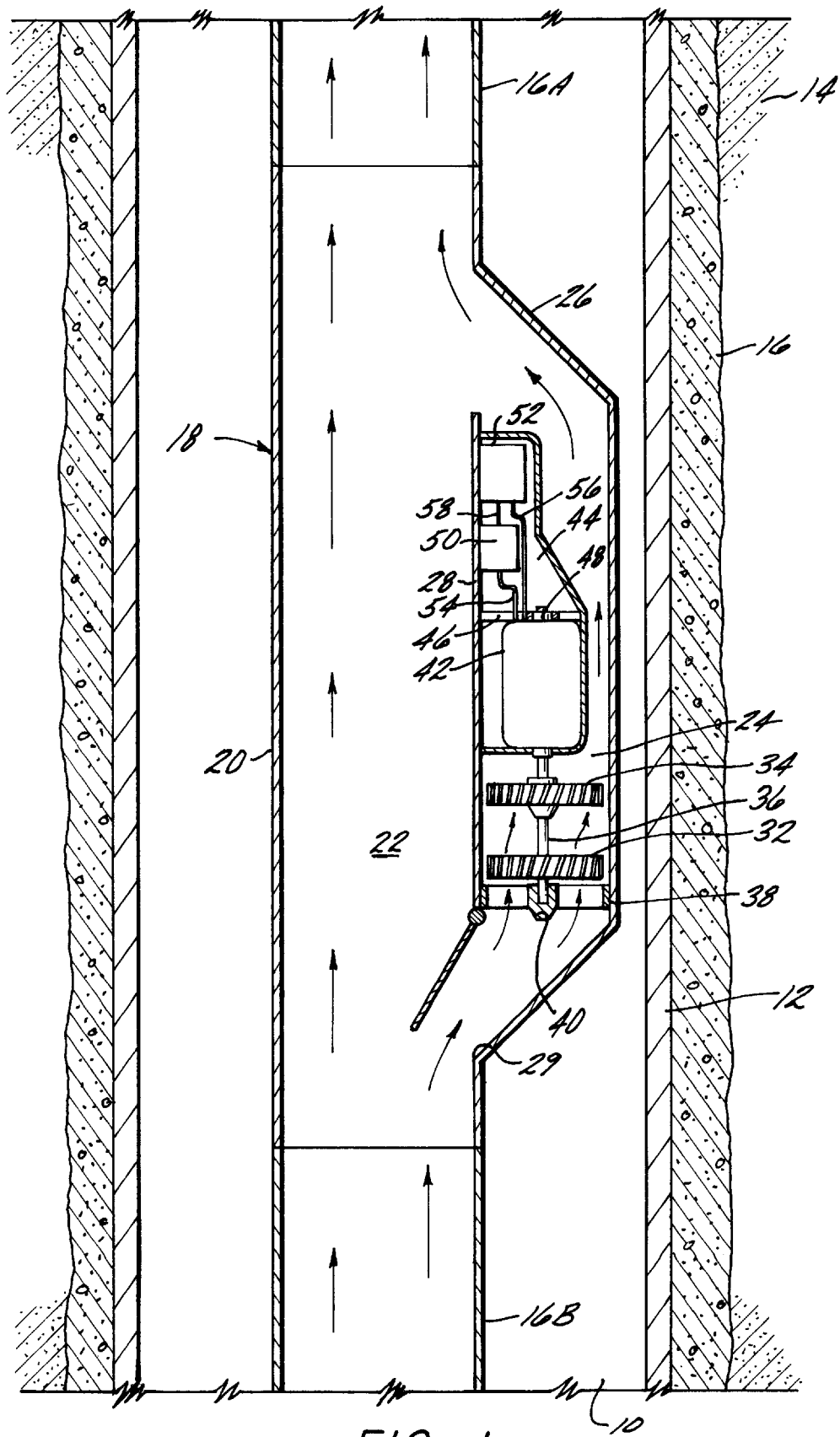
FIG. 1 is a cross-sectional elevation view of a downhole power generating apparatus in accordance with this invention utilizing a turbine located in a side passageway.

Referring first to FIG. 1, a downhole electrical generating apparatus in accordance with a first embodiment of this invention is shown. FIG. 1 more particularly depicts a production well 10 for producing oil, gas or the like. Well 10 is defined by well-known well casing 12 which is cemented or otherwise permanently positioned in earth 14 using an appropriate cement or the like 16. Well 10 has been completed in a known manner using production tubing with an upper section of production tubing being shown at 16A and a lower section of production tubing being shown at 16B. Attached between production tubing 16A and 16B, at an appropriate location, is the electrical power generating apparatus in accordance with the present invention which is shown generally at 18. Power generating apparatus 18 comprises a housing 20 having a primary flow passageway 22 which communicates with and is generally in alignment with production tubing 16A and 16B. Housing 20 also includes a side passageway 24 which is laterally displaced from primary flow passageway 22. Side passageway 24 is defined by a laterally extending section 26 of housing 20 and an interior dividing wall 28. Shown by the arrows, production fluids such as petroleum are produced from below electrical generating device 18 and travel upwardly through production tubing 16B into housing 20 whereupon the production fluid travels both through the primary passageway 22 and the side passageway 24. Upon reaching the upper portion of side passageway 24, the production fluid again enters the primary passageway 22 and then travels on upwardly into the upper section of production tubing 16A.

The amount of fluid traveling into side passageway 24 may be controlled using a flow diverter 30 which is pivotally attached to wall 28. Flow diverter 30 may shut off all fluid flow into side passageway 24 or in contrast, open up the fluid flow into side passageway 24 so as to divert a varying amount of fluid therethrough. Diverter 30 may be controlled from the surface using coil tubing or other tools.

Figure 6:
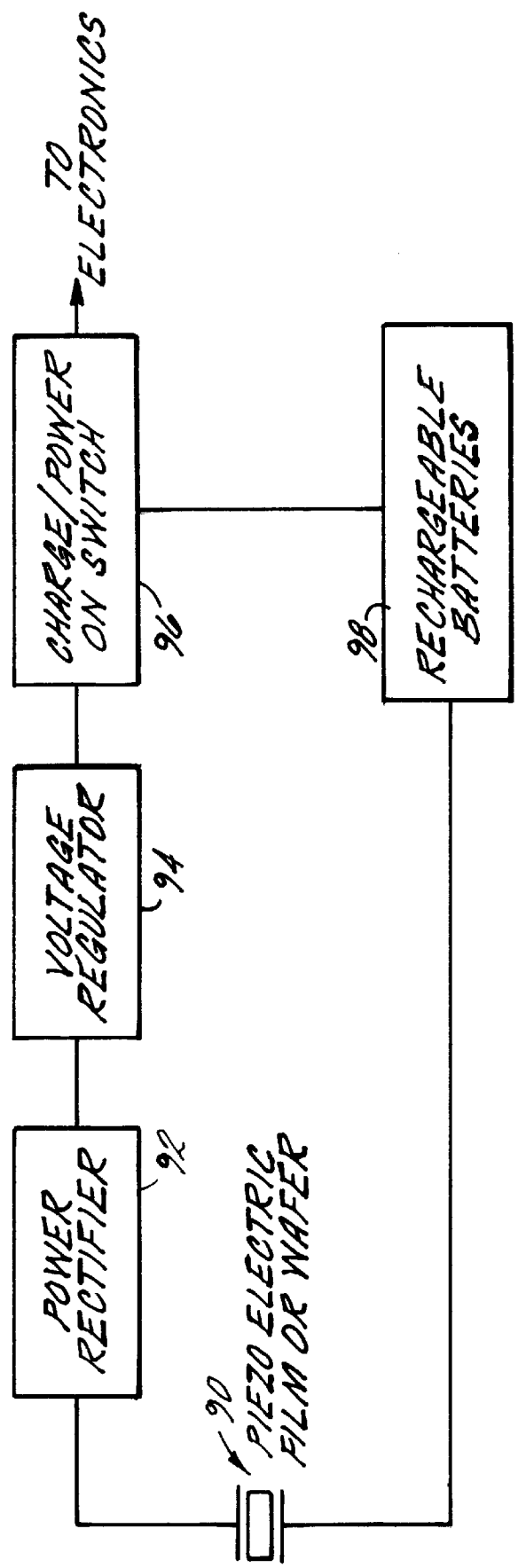
FIG. 6 is an electrical schematic of the circuitry involved in the embodiment of FIG. 5 for converting signals from the piezoelectric device to electricity and/or stored power.

In the first embodiment of FIG. 1, the electrical generating means utilizes one or more turbines (in this case two turbines 32 and 34). Turbines 32, 34, are mounted on a shaft 36. Shaft 36 is rotatably mounted in a lower mount 38 where a centrally located bearing 40 permits shaft 36 to freely rotate therein. The upper section of shaft 36 is mounted to a conventional electrical generator 42 such that rotation of shaft 36 will rotate so as to produce electricity in a known manner. In a preferred embodiment, generator 42 is positioned in a fluid tight chamber 44 so as to preclude the adverse effects of the pressurized and high temperature production fluids flowing through side passageway 24. Shaft 36 terminates within chamber 44 at a support 46 which houses an upper bearing 48. Also located in chamber 44 is a rechargeable battery 50 and a computer or other device 52 which includes at least one circuit which requires electrical power. Electrical generator 42 communicates directly through a first wire 54 to battery 50 and through a second wire 56 to computer 52. In turn, rechargeable battery 50 communicates with computer 52 through a wire 58. As will be discussed, rechargeable battery 50 may comprise any conventional rechargeable battery which is adapted for high temperature operations. As mentioned, item 52 may comprise any device or group of devices which include at least one electrical circuit which is powered by the present invention. For example, item 52 may comprise a computer such as shown at 50 in FIG. 6 of aforementioned U.S. application Ser. No. 08/385,992. In this latter example, power source 66 as shown in FIG. 6 of U.S. Ser. No. 08/385,992 could be constituted by either rechargeable battery 50 or electrical generator 42.

It will be appreciated that one or more of electrical generator 42, battery 50, computer 52 and any other component associated with the turbines may be located in another location (such as in the annulus) so long as these components do not block the primary passageway 22.

It will further be appreciated that the separation between primary flow passageway 22 and the electrical generating apparatus in side passageway 24 could be effected using a liner for separation as opposed to the more complex housing 20.

During operation, production fluid flowing upwardly through production tubing 16B is diverted by diverter 30 into side passageway 24 whereupon the fluid will rotate in a known manner turbines 32 and 34. Rotating turbines 32, 34 will cause shaft 36 to rotate which in turn, will provide the necessary rotation for the generation of electricity in generator 42. Electricity generated by generator 42 (which, if necessary, is converted from AC to DC using a known AC/DC converter) may be used either to directly power a circuit in item 52 and/or may be used to recharge battery 50. If item 52 is a computer, then the computer may be programmed to receive electrical power either directly from generator 42 or from battery 50. In some cases, it may be preferable that computer 52 only receive its power from battery 50. When fluid flow in production tubing 16B ceases, rechargeable battery 50 can supply, on a continuous or intermittent basis, power to computer 52. The amount of fluid flowing into side passageway 24 may be controlled by diverter 30 depending on the need for electricity and other relevant factors. It will be appreciated that computer 52 will communicate with other downhole devices such as described in more detail in application Ser. No. 08/385,992.

Figure 1A:
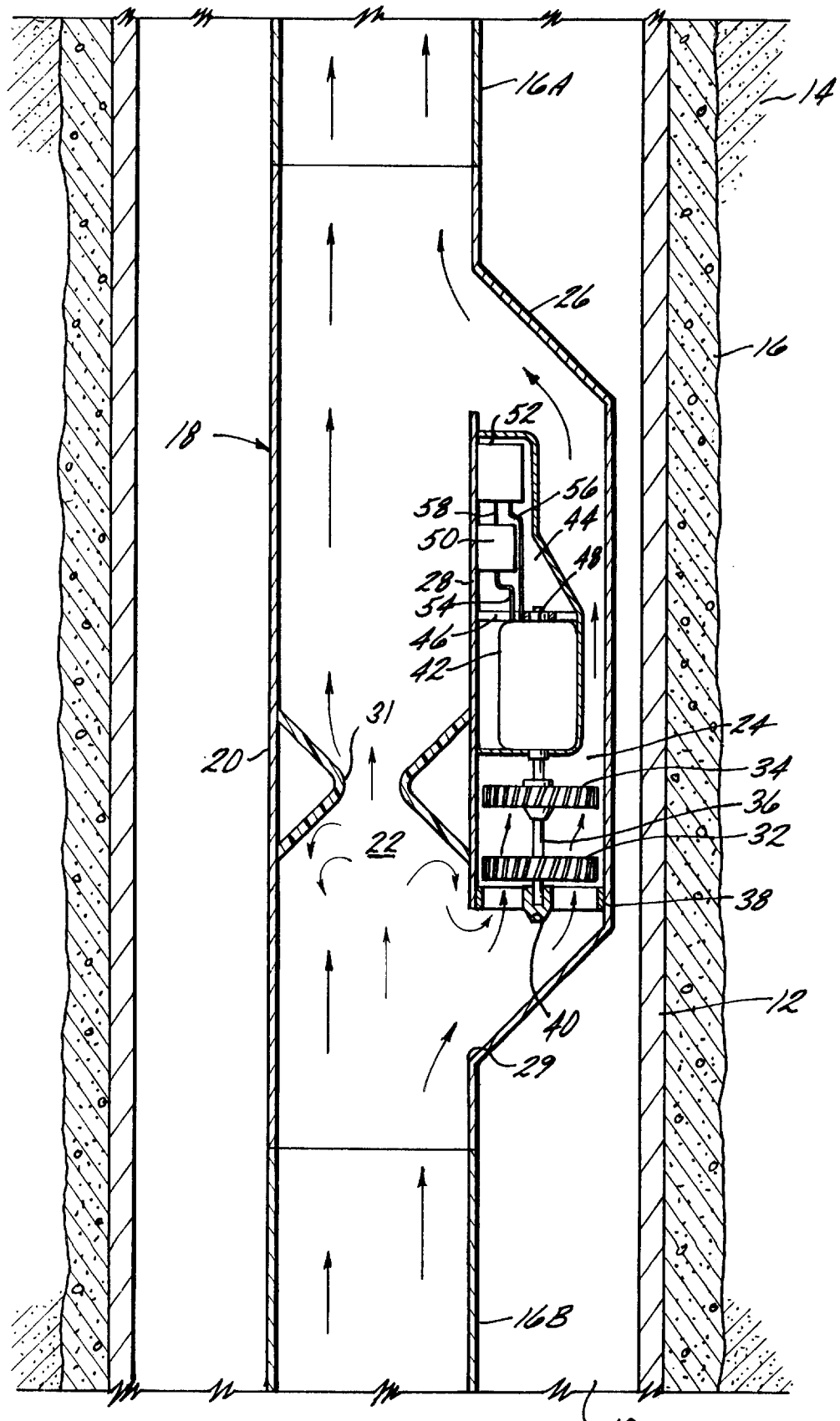
FIG. 1A is a cross-sectional elevation view of a downhole power generating apparatus, similar to FIG. 1, but utilizing an alternative fluid diverter.

In FIG. 1A, an alternative flow diverter means is shown wherein a flexible, tapered restriction 31 (which may be made from an high temperature elastomer or other appropriate material) is attached to the inner surface of primary passage 22 near the opening 29 to side passage 24. This flexible restriction 31 ensures fluid flow through lateral passage 24 as shown by the arrows. In addition, should a tool, coiled tubing or other object be required to pass through primary passage 22, restriction 31 will easily yield (deflect outwardly towards the inner walls of tubing 22) to the object. After the object has passed, the restriction 31 will recover to its original shape.

Figure 2:
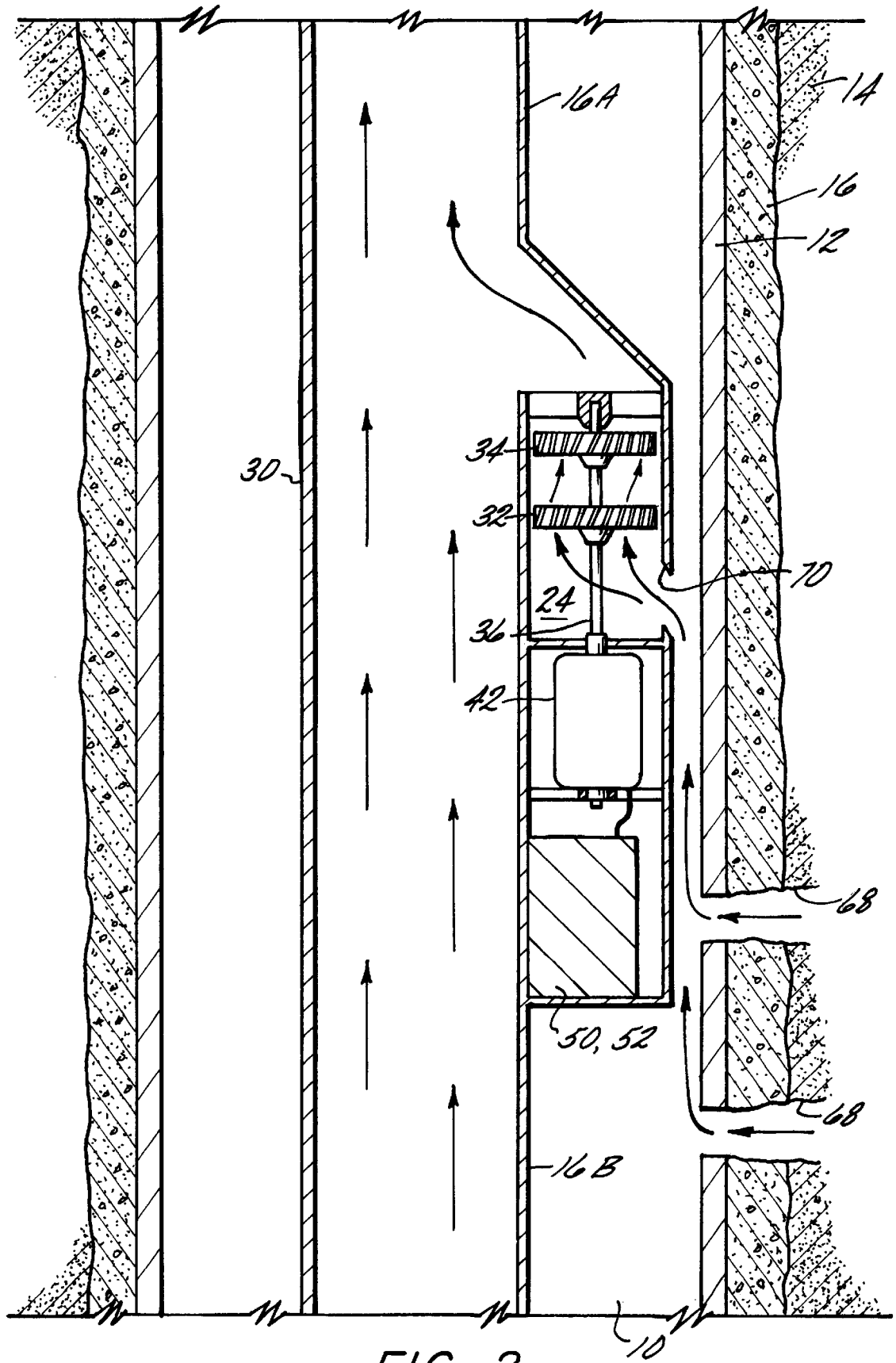
FIG. 2 is a cross-sectional elevation view of a downhole power generating apparatus, similar to FIG. 1, but being responsive to fluid flow from the annulus.

Referring to FIG. 2, an electrical power generating device utilizing a turbine similar to FIG. 1 is shown. The main difference between the embodiments of FIG. 1 and FIG. 2 is that in FIG. 2, the turbine is actuated by production fluid flowing in from the annulus as opposed to flowing in from within the production tubing itself. More particularly, side passageway 24 is shown which includes turbine 32, 34 mounted on a shaft 36 which in turn is mounted to a generator 42. The generator communicates with an energy storage device 50 (battery) and associated electronics 52 as in FIG. 1. Perforations 68 have been formed through the casing 12, cement 16 and formation 14 so as to allow production fluid (indicated by the arrows) to flow from the formation and into the annulus 10. These formation fluids travel upwardly through at least one opening 70 and into the side passageway 24 whereupon the fluid interacts with turbines 32, 34 causing the turbines to rotate and generate electricity in the same manner as was discussed in detail with regard to FIG. 1. After passing through turbines 32, 34, the fluid continues to flow upwardly and into the primary flow passageway of production tubing 20. It will be appreciated that the alternative embodiment of FIG. 2 may be utilized in those locations downhole where formation fluids are being produced at or near the power generating location as shown in FIG. 2. Of course, the FIG. 2 embodiment can also have an opening of the type shown at 29 in FIG. 1 (with or without a flow diverter 30) so that turbines 32, 34 could be actuated from production fluid which both is flowing upwardly through tubing 16 and which is flowing outwardly from the formation into annulus 10.

Figure 3:
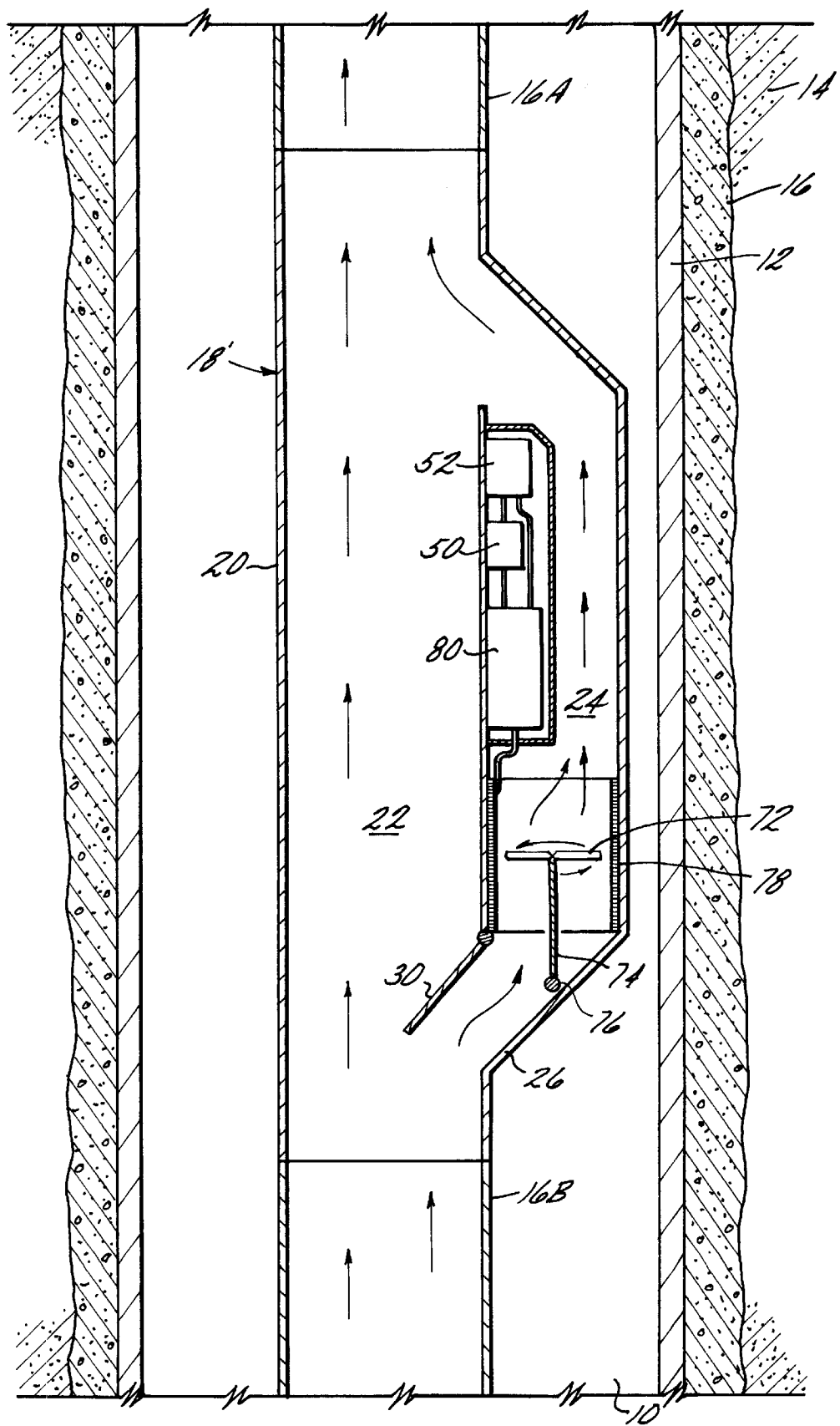
FIG. 3 is a cross-sectional elevation view of a downhole power generating apparatus in accordance with this invention utilizing an oscillating reed.

Turning now to FIG. 3, a second embodiment of the power generating apparatus of the present invention is shown. This second embodiment is substantially similar to the first embodiment of FIGS. 1 and 2 with the primary difference being that rather than using the turbine based generator of FIG. 1, the second embodiment utilizes an alternative power generating source wherein the movement of a magnetic field is used to create a magnetic flux for electrical power generation. This movable magnetic field is obtained using a reed or the like 72 which is mounted on a shaft 74 within lateral housing 26 using mount 76. Reed 72 comprises a permanent magnet which is rotatable (in a manner analogous to a propeller) relative to shaft 74. Lower portion 26 of side passageway 24 includes a coil 78 with reed 72 being positioned within coil 78. The north and south poles of reed 72 are positioned transverse to the cylindrically shaped coil 78 such that when reed rotates or oscillates, a magnetic flux will be induced on coil 78 in a known manner. Electrically communicating with coil 78 is a converter 80 which converts AC electrical output to DC electrical energy. As in the FIG. 1 embodiment, converter 80 is connected directly to a rechargeable battery 50 and a computer or other device which incorporates an electrical circuit 52.

As discussed above, the change in the magnetic field induced in the coils 78 will generate the electrical power that will be rectified and stored in the rechargeable battery cell 50. One of the basic equations underlying this power generation technique (as well as the other techniques described herein which rely on a movable magnetic field) is:

$$dW(L,X)=1*dL-FdX$$

where

W is the system energy;

L is the magnetic flux;

X is the displacement of the armature;

1 is the electric current; and

F is the mechanical force.

It will be appreciated that the energy is constant and the magnetic flux is the link between the electrical force and the mechanical force.

During operation, production fluid travels upwardly from production tubing 16B into housing 20 whereupon the fluid travels both through the primary passageway 22 and is diverted by optional diverter 30 into the side passageway 24. The fluid flowing into side passageway 24 acts to oscillate or rotate reed 72 as shown by the arrows in FIG. 3. The movement of reed 72 within the coil 78 creates a magnetic flux (e.g., a movable magnetic field) which is converted in a known manner to electricity. As in the FIG. 1 embodiment, converter 80 may then directly provide electricity either to rechargeable battery 50 or to item 52.

Figure 4A:
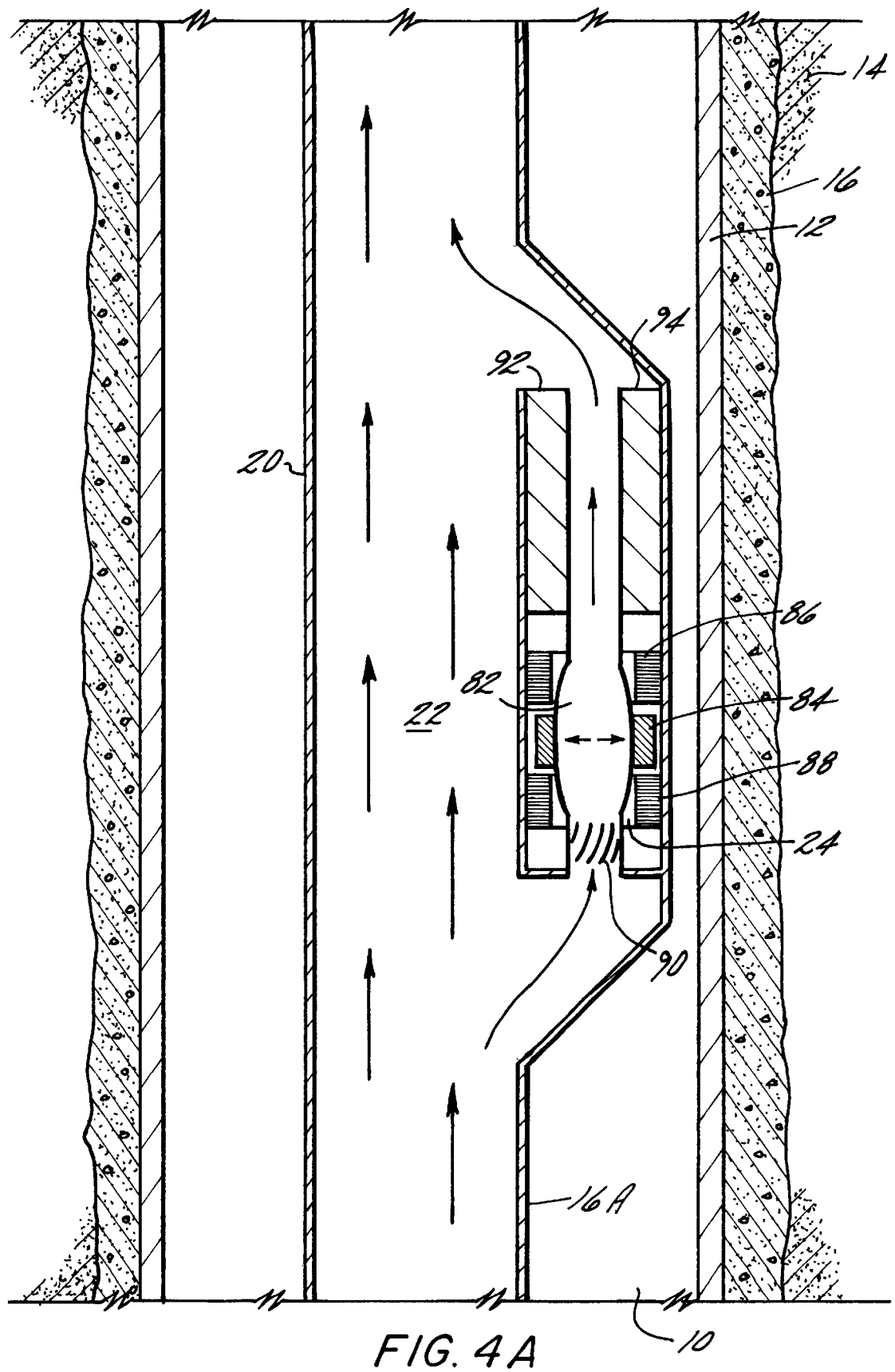
FIGS. 4A and 4B are cross-sectional elevation views of related downhole power generating apparatuses in accordance with this invention utilizing a movable bladder associated with a magnet/coil assembly for generating electrical power downhole.
Figure 4B:
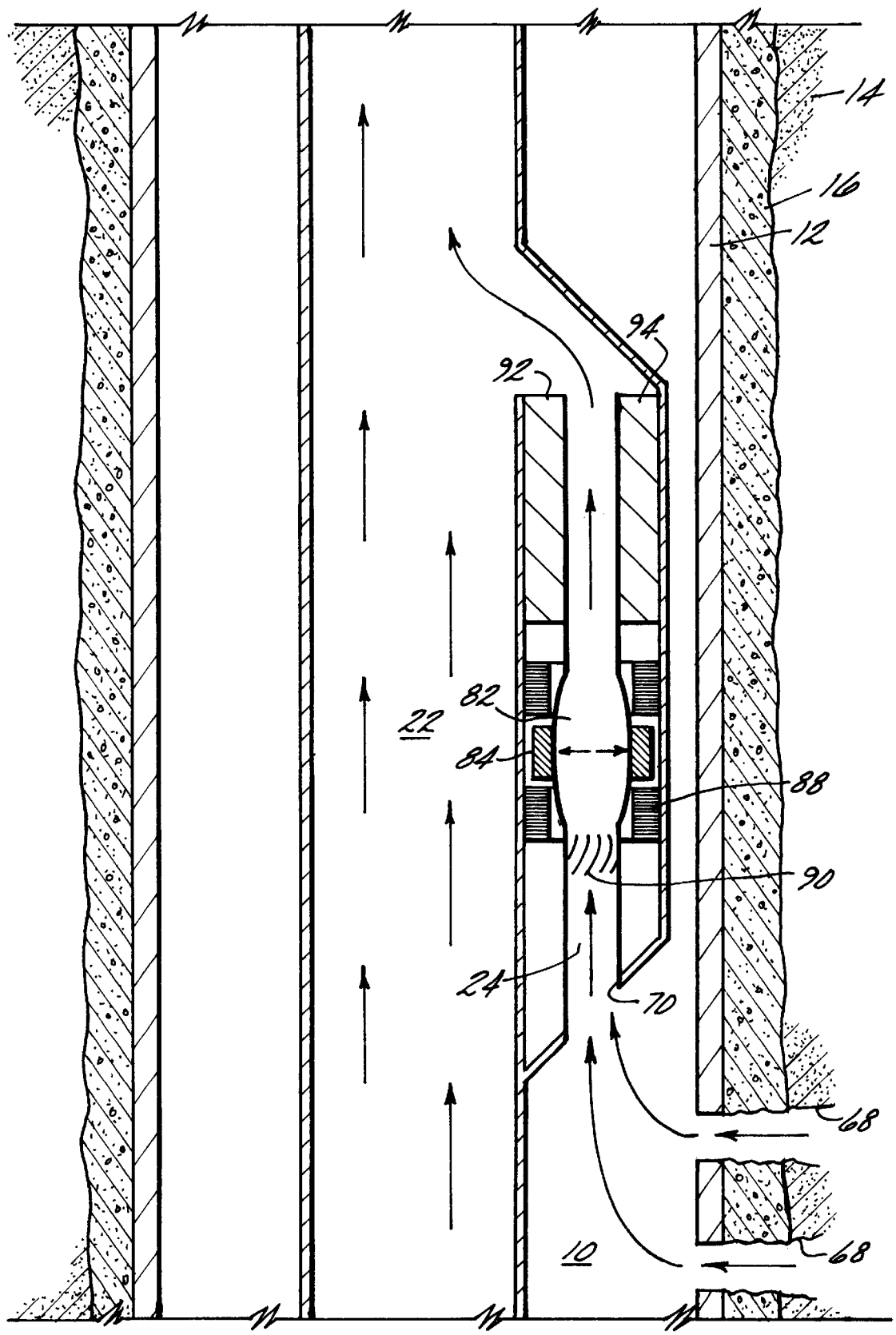

Turning now to FIGS. 4A and 4B, in accordance with a third embodiment of the present invention, a movable magnetic field is created within the side passageway 24 using an expandable bladder 82 having one or more magnets 84 attached to the outer periphery thereof. On either side of magnets 84 are a pair of coils 86, 88. Coils 86, 88 are attached to the inner walls of side passageway 24. Preferably, a turbulence enhancer 90 which may consist of a plurality of appropriately spaced and contoured vanes, is positioned upstream of bladder 82 at the inlet to side passageway 24. Coils 86, 88 are in electrical communication with an electronics module 92 and rechargeable battery 94.

During operation, fluid flows upwardly through production tubing 16 and a portion of the fluid is diverted (using if desired, a diverter 30 as shown in FIG. 1) into side passageway 24 where it is directed through turbulence enhancer 90 and into the flexible bladder 82. The turbulence enhancer 90 will cause the fluid to undergo a turbulent motion and thereby cause the flexible bladder 82 to undulate and move magnets 84 within the annular space defined between coils 86 and 88. As a result, a magnetic flux will be developed on coils 86 and 88 thereby producing electrical energy which will flow to electronics 92 and rechargeable battery 94 in a manner as described above with regard to the FIG. 3 embodiment.

As mentioned, in the FIG. 4A embodiment of this invention, the production flow within tubing 16 causes the bladder 82 to move and undulate and thereby produce electricity. Alternatively, in the FIG. 4B embodiment, production fluid from perforations 68 of the type described in FIG. 2 are directed into the annulus and flow within side passageway 24 through an opening 70 and into bladder 82. It will be appreciated that the FIG. 4B embodiment could also include an inlet to side passageway 24 from primary flow passageway 22 as in the FIG. 4A embodiment.

Figure 5:
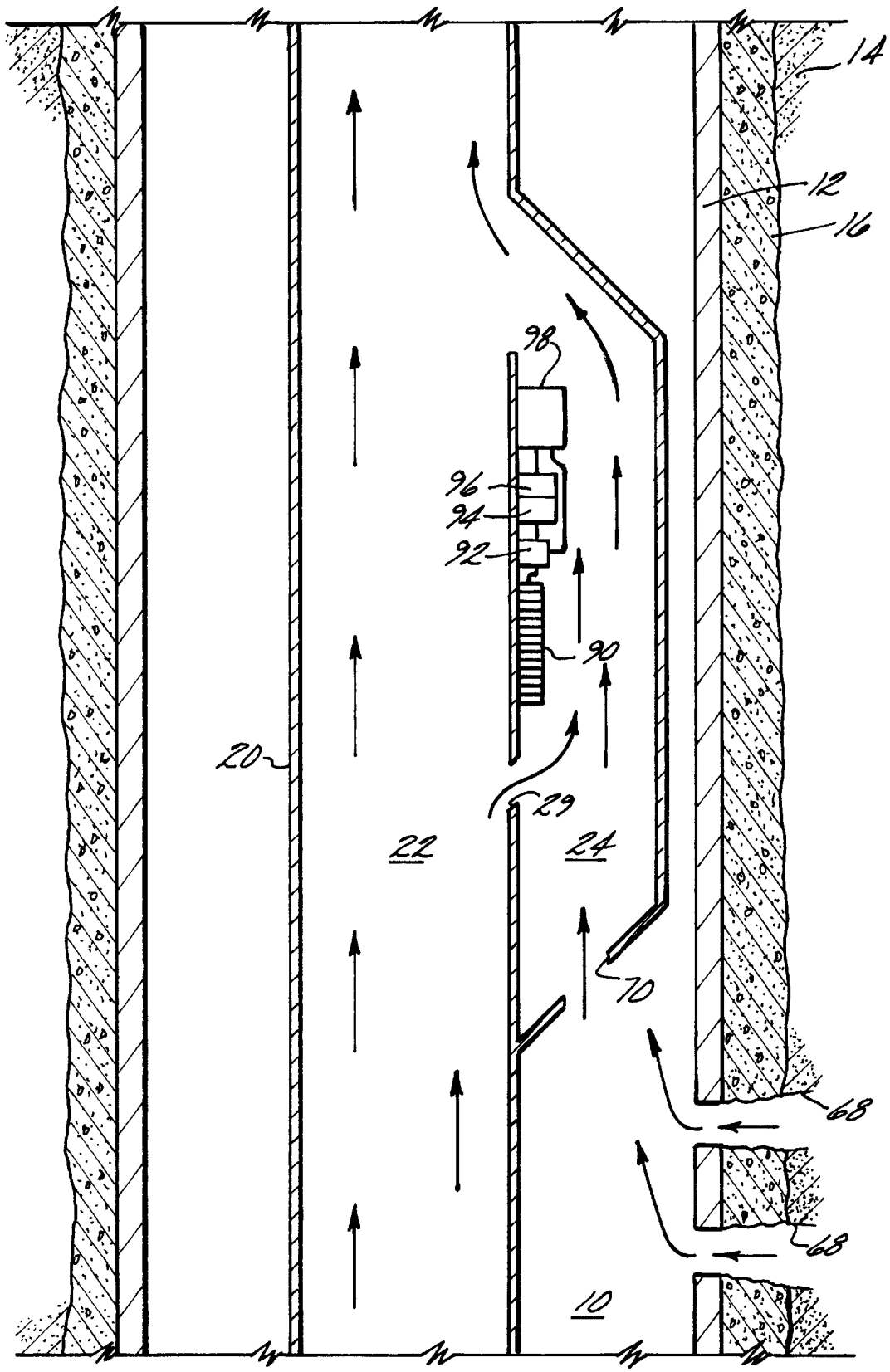
FIG. 5 is a cross-sectional elevation view of a downhole power generating apparatus in accordance with this invention utilizing a piezoelectric generating device located in a side passageway.

Turning now to FIG. 5, still another embodiment of this invention wherein an electrical generating device is positioned at least in part, within a side passageway is shown. In the FIG. 5 embodiment, the electrical generating device comprises a stack of piezoelectric elements 90 which are connected to a power rectifier 92, voltage regulator 94, charge/power on switch 96 and rechargeable battery 98 as schematically shown in FIG. 6. Piezoelectric elements 90 are composed of a low level force to electrical charge piezoelectric crystal or film. A vibration amplifier will convert the flow turbulence from within tubing 16 into a motion (e.g., vibration or stress) outside the tubing. The piezoelectric wafer stack is mounted with a motion generator to convert the movements into electrical charges. The power rectifier circuit 92 will process the electrical charges into an electrical direct current. The output voltage from rectifier 92 will be regulated via regulator 94 to create a signal compatible with the battery cells 98. The charge/power-on circuit 96 will determine if the battery cell 98 should be charged or if the battery pack should deliver power to the electronic circuit (such as item 52 in FIG. 1). A dual battery pack (identified as "1" and "2" in element 98) is preferred such that one pack will deliver power to the electronics while the other pack is being recharged. As shown in FIG. 5, the piezoelectric stack 90 may be actuated by movement of fluid flowing both within production tubing 16 as well as from the annulus 10 through the aforementioned perforation 68 and out of the formation. Piezoelectric stack 90 is composed of any one of several known materials including piezoelectric crystalline materials or polymeric films such as polyvinyl chloride film. Such known materials generate electrical power once a mechanical force such as vibration or stress is exerted onto the stack. In this case, the vibration or stress will be exerted onto the stack through the production fluid impacting upon the stack via the tubing wall 28.

While the foregoing embodiments of the present invention shown in FIGS. 1–6 generate electricity by the positioning of an electrical generating device in a lateral passageway and then generating electricity through the interaction of fluid being produced either from the formation into the annulus or from within the production tubing itself, in FIGS. 7A, 7B and 8, an alternative method of generating electricity will be described wherein pressure waves are sent downwardly through a suitable fluid so as to actuate a suitable power generation device. In the FIG. 7A embodiment, this power generation device is again positioned in a lateral chamber 24 which is positioned outside of the primary flow passage. More particularly, the power generation device comprises a permanent magnet 100 which extends outwardly from a piston 102. Piston 102 sealingly engages a suitably sized cylinder 104 (via seal 106). A spring 107 is sandwiched between piston 106 and the interior base 108 of cylinder 104. Spring 107 surrounds magnet 100. It will be appreciated that when a force urges the upper surface 110 of piston 102 downwardly, spring 107 will be compressed such that when the force on surface 110 is removed, spring 107 will urge upwardly to place piston 102 into its normal position. Surrounding chamber 104 and positioned in facing alignment to the normal position of magnet 100 is a coil 112. Coil 112 in turn electrically communicates with an electronics and battery package 114 of the type described above with regard to the embodiments shown in FIGS. 1–5.

During operation, assuming that production fluid or other fluid is present within the primary passage 16, pressure waves indicated by the lines 115 are directed downwardly from the surface or from some other position downstream of side passageway 24 and impinge upon surface 110 of piston 102. The pressure waves are delivered over a selected intermittent and timed sequence such that piston 102 will be sequentially urged downwardly when impinged by a pressure wave. During the time period that the pressure wave has passed and before the next pressure wave impinges upon piston 102, spring 107 will urge piston 102 upwardly to its normal position. As a result, piston 102 will undergo a reciprocating upward and downward motion whereby magnet 100 will similarly reciprocate within the annular opening defined between coil 112. The result is a magnetic flux which will generate electricity in a known manner and supply the electricity to the appropriate electronics and storage battery 114 as discussed above regarding the embodiments of FIGS. 3 and 4A–B.

Figure 7A:
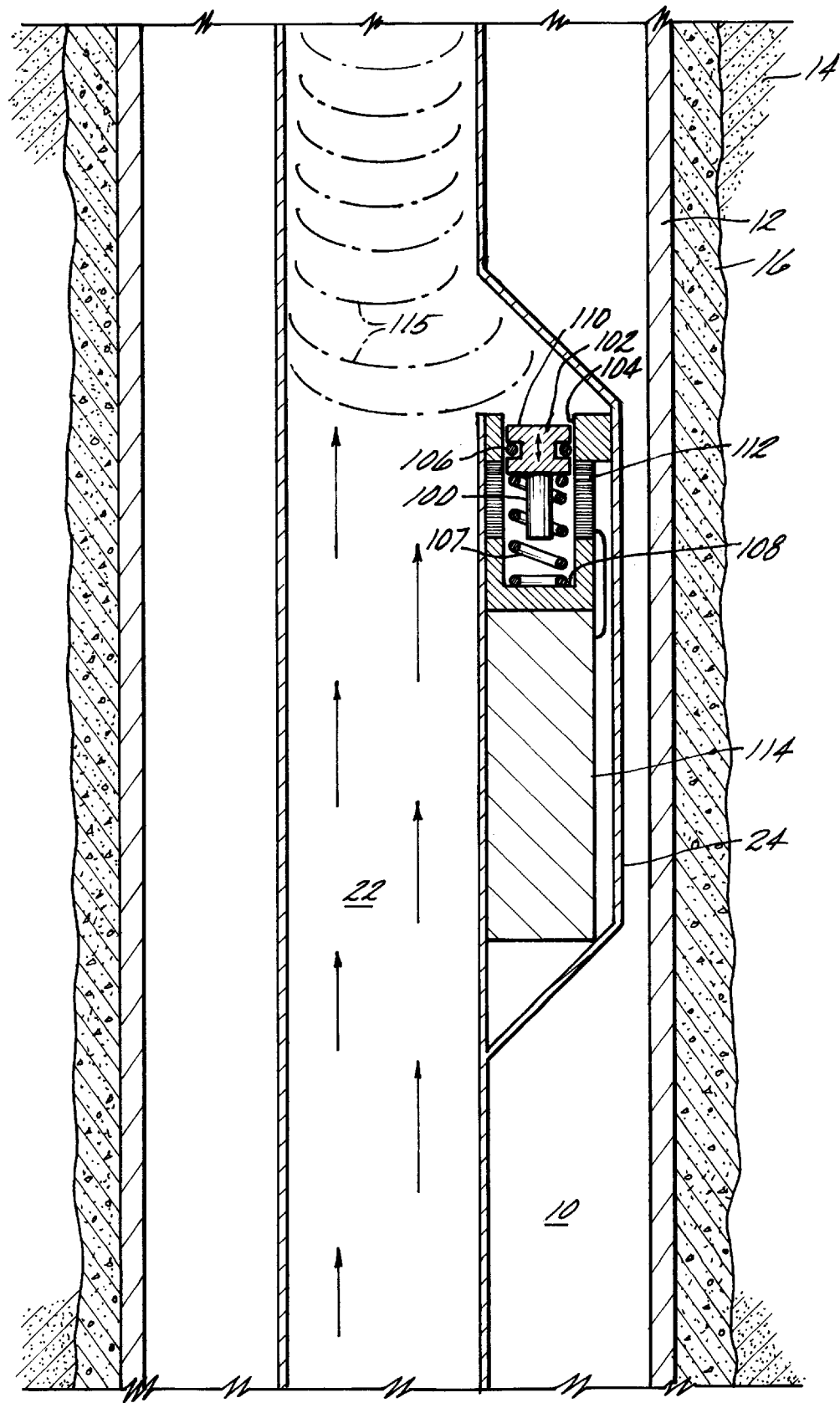
FIG. 7A is a cross-sectional elevation view of a downhole power generating apparatus in accordance with this invention wherein a spring actuated magnetic/coil assembly generates power in response to pressure waves.
Figure 7B:
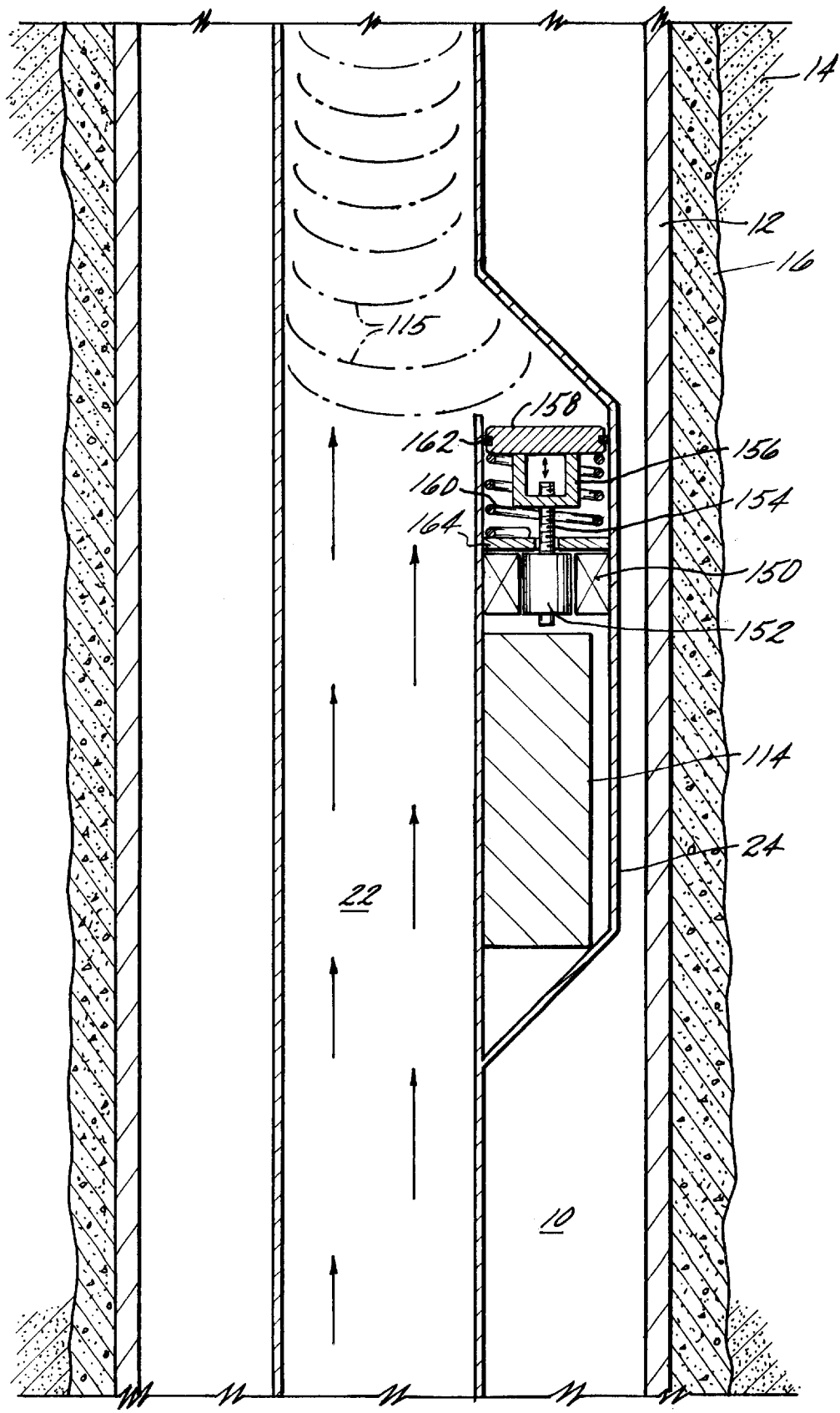
FIG. 7B is a cross-sectional elevation view of a downhole power generating apparatus in accordance with this invention wherein a spring actuated gernerator armature assembly generates power in response to pressure waves.

FIG. 7B depicts an embodiment similar to that shown in FIG. 7A. In the FIG. 7B embodiment, the power generation device is again positioned in a lateral chamber 24 which is positioned outside of the primary flow passage. More particularly, the power generation device comprises a magnetic coil 150 and a generator armature 152. The generator armature 152 and the magnetic coil 150 form a conventional electrical generator. A generator drive shaft 154 couples the generator armature 152 to a piston body 156 and piston head 158. The drive shaft 154 converts linear motion by the piston body 156 into rotational motion to turn the generator armature. Piston head 158 sealingly engages the wall of the lateral chamber through a seal 162. A spring 160 is sandwiched between the bottom of the piston head 158 and a base 164. It will be appreciated that when a force urges the piston head 158 downwardly, the piston body 156 causes the shaft 154 to turn the generator armature 152. The generator produces electricity that is supplied to electronics and battery package 114 of the type described above. The spring 160 will be compressed such that when the force on the piston head 158 is removed, spring 160 will urge upwardly to place piston head 158 into its normal position.

During operation, assuming that production fluid or other fluid is present within the primary passage 16, pressure waves indicated by the lines 115 are directed downwardly from some position downstream of side passageway 24 and impinge upon the piston head 158. The pressure waves are delivered over a selected intermittent and timed sequence such that piston head 158 will be sequentially urged downwardly when impinged by a pressure wave. During the time period that the pressure wave has passed and before the next pressure wave impinges upon piston head 158, spring 160 will urge piston head 158 upwardly to its normal position. As a result, piston head 158 will undergo a reciprocating upward and downward motion whereby the piston body 156 will similarly reciprocate causing the drive shaft 154 to turn the generator armature 152. The drive shaft 154 may be spiral cut in both directions so that downhole and uphole motion by the piston body 156 drives the generator armature 152 in the same direction. The electricity produced by the generator is supplied to the appropriate electronics and storage battery 114 as discussed above regarding the embodiments of FIGS. 3 and 4A–B.

Figure 8:
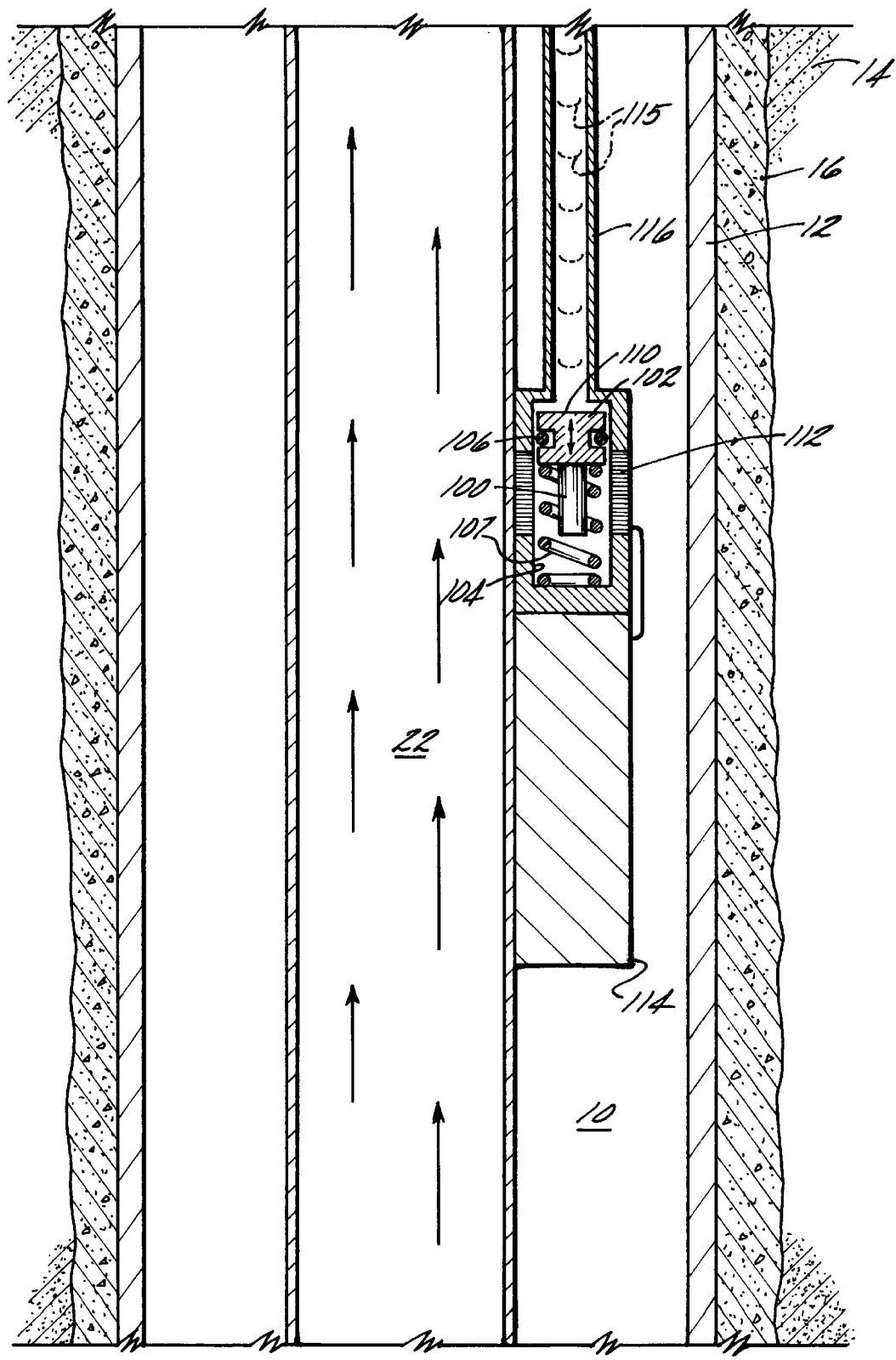
FIG. 8 is a cross-sectional elevation view of a downhole power generating apparatus in accordance with this invention, similar to the power generating device of FIG. 7, with the pressure waves being delivered via a separate control line.

FIG. 8 depicts an embodiment which is similar to FIG. 7A in its use of a reciprocating spring actuated piston which moves a magnet with respect to a stationary coil. The primary difference between the embodiments of FIGS. 7A and 8 is that in the FIG. 8 embodiment, the pressure waves used to periodically impinge upon surface 110 of piston 102 are delivered by a discrete control line 116 which is positioned in the annulus 10 between the production tubing and the casing. The discrete control line 116 may also be used with the embodiment shown in FIG. 7B.

Figure 7C:
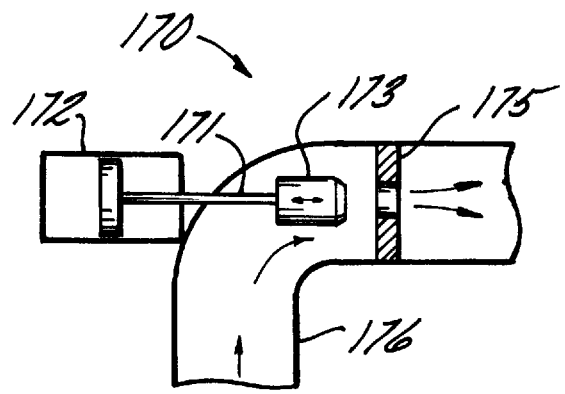
FIG. 7C is a cross-sectional view of a device for producing pressure pulses.

The pressure waves 115 shown in FIGS. 7A, 7B and 8 may be generated by injecting an energy pulse into the fluid using an external device at the surface of the well. Alternatively, a device may be positioned within the well to produce the pressure waves 115. FIG. 7C illustrates a choke assembly shown generally as 170. Fluid flow in tubing 176 is sharply and momentarily stopped by the choke assembly 170. This causes a back pressure wave that will flow the length of the well and provide the pressure pulses 115 shown in FIGS. 7A, 7B and 8. The actuator 172 drives a rod 171 having a head 173 that engages a seat assembly 175. The actuator 172 repeatedly engages and disengages the head 173 and the seat assembly 175 to form a series of pressure pulses 115 shown in FIGS. 7A, 7B and 8.

Figure 7D:
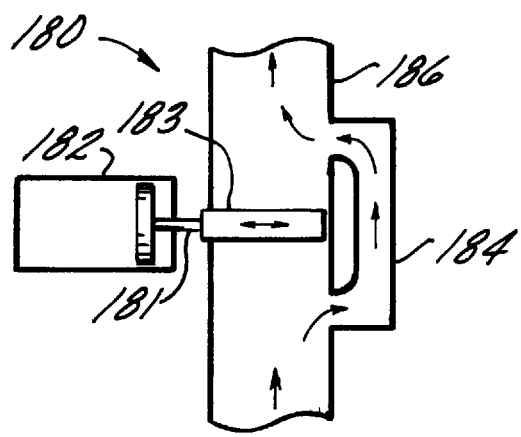
FIG. 7D is a cross-sectional view of an alternative device for producing pressure pulses.

FIG. 7D is an alternative mechanism for generating the pressure pulses 115. FIG. 7D illustrates a valve assembly shown generally at 180. Fluid flow in tubing 186 is stopped momentarily by a valve gate 183. The valve gate 183 is connected to a rod 181 which is driven by actuator 182. The actuator 182 repeatedly inserts and removes the valve gate 183 from the tubing 186 to form a series of pressure pulses 115 shown in FIGS. 7A, 7B and 8. An optional side flow path 184 is also shown in FIG. 7D. The optional side flow path 184 allows fluid to continue to flow in the tubing 186 when the valve gate 183 has sealed the primary path of the tubing 186. Thus, it is not necessary to completely shut off the fluid flow to generate the series of pressure pulses.

Figure 9:
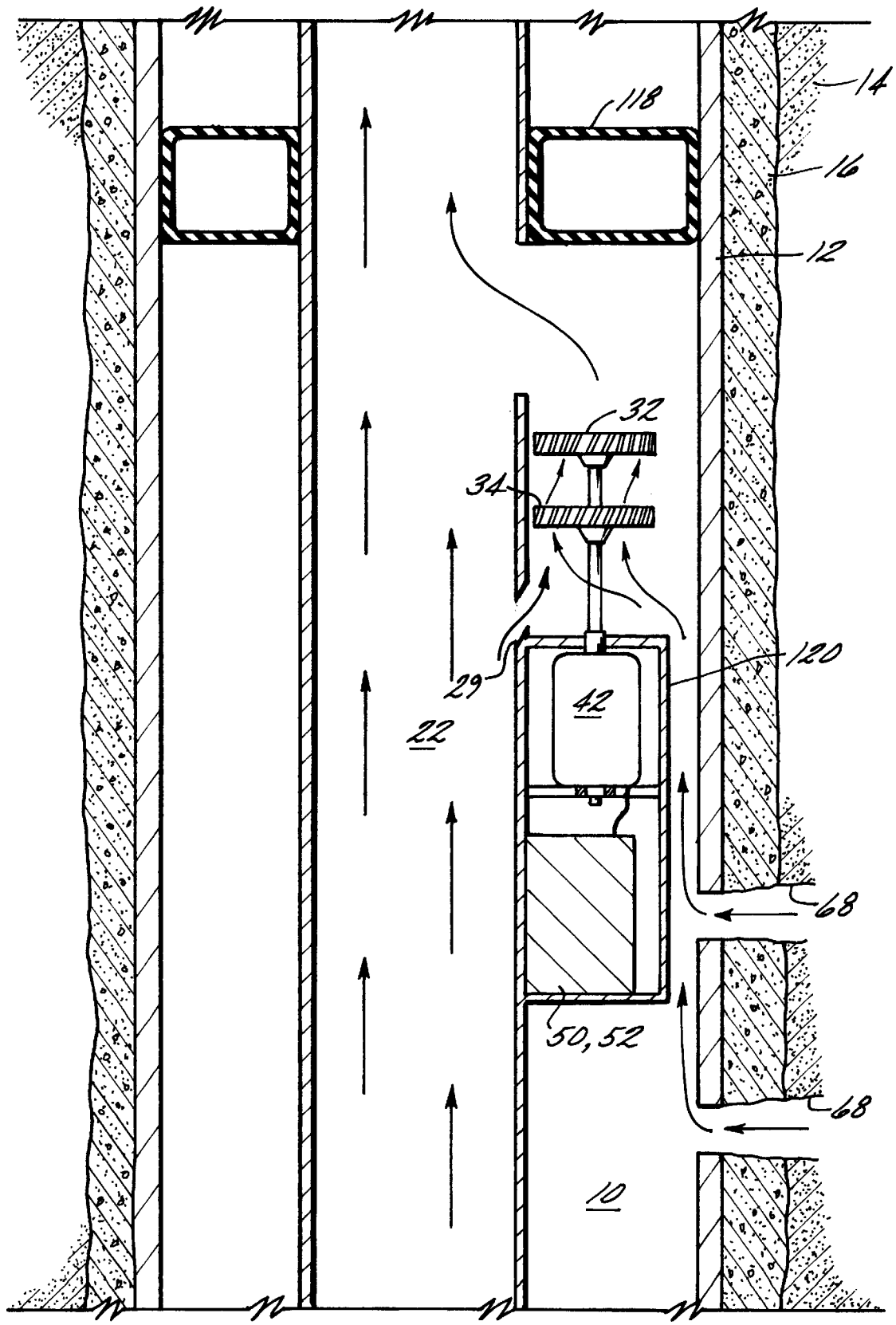
FIG. 9 is a cross-sectional elevation view of a downhole power generating apparatus in accordance with this invention utilizing a turbine positioned in the annulus between the production tubing and the casing or borehole wall.

While many of the foregoing embodiments utilize downhole electrical energy generating apparatus which are positioned in a lateral or side passageway adjacent the primary fluid passageway of the production tubing, it will be appreciated that downhole electrical energy generating apparatus could also be positioned outside of a lateral passageway. That is, energy generating apparatus could simply be positioned within the annulus between the production tubing and the casing or borehole wall. By placement in the annulus, the electrical energy generating apparatus would still not be blocking the primary flow passage of the production tubing as is prevalent with many prior art devices such as the device disclosed in aforementioned U.S. Pat. No. 3,342,267. Examples of locating the downhole energy generating apparatus in the annulus are shown in the following FIGS. 9–11. In FIG. 9, a downhole electrical generating apparatus is shown which is substantially similar to that shown in FIG. 2 with the difference being that no outer housing or lateral passageway shrouds the turbine and therefore the electrical generating apparatus is openly positioned in the annulus and is not surrounded by a lateral passageway. It will be appreciated that the turbine is actuated by fluid flowing from perforation 68 in the formation as indicated by the arrows and/or fluid flowing up the primary passageway 22 through opening 29. A packer is shown at 118 downstream of turbine 32 for sealing off the selected portion of the annulus 10 and causing the fluid flowing past turbines 32, 34 to flow back into the primary passageway 22. While the generator 42, energy storage device 50, and electronics 52 are shown enclosed by an enclosure 120, it will be appreciated that these units could also be exposed within the annulus to the annulus fluids. However, it is preferred that units 42, 50 and 52 are protected by enclosure 120 so as to avoid any damage from fluids and other debris within the annulus.

Figure 10A:
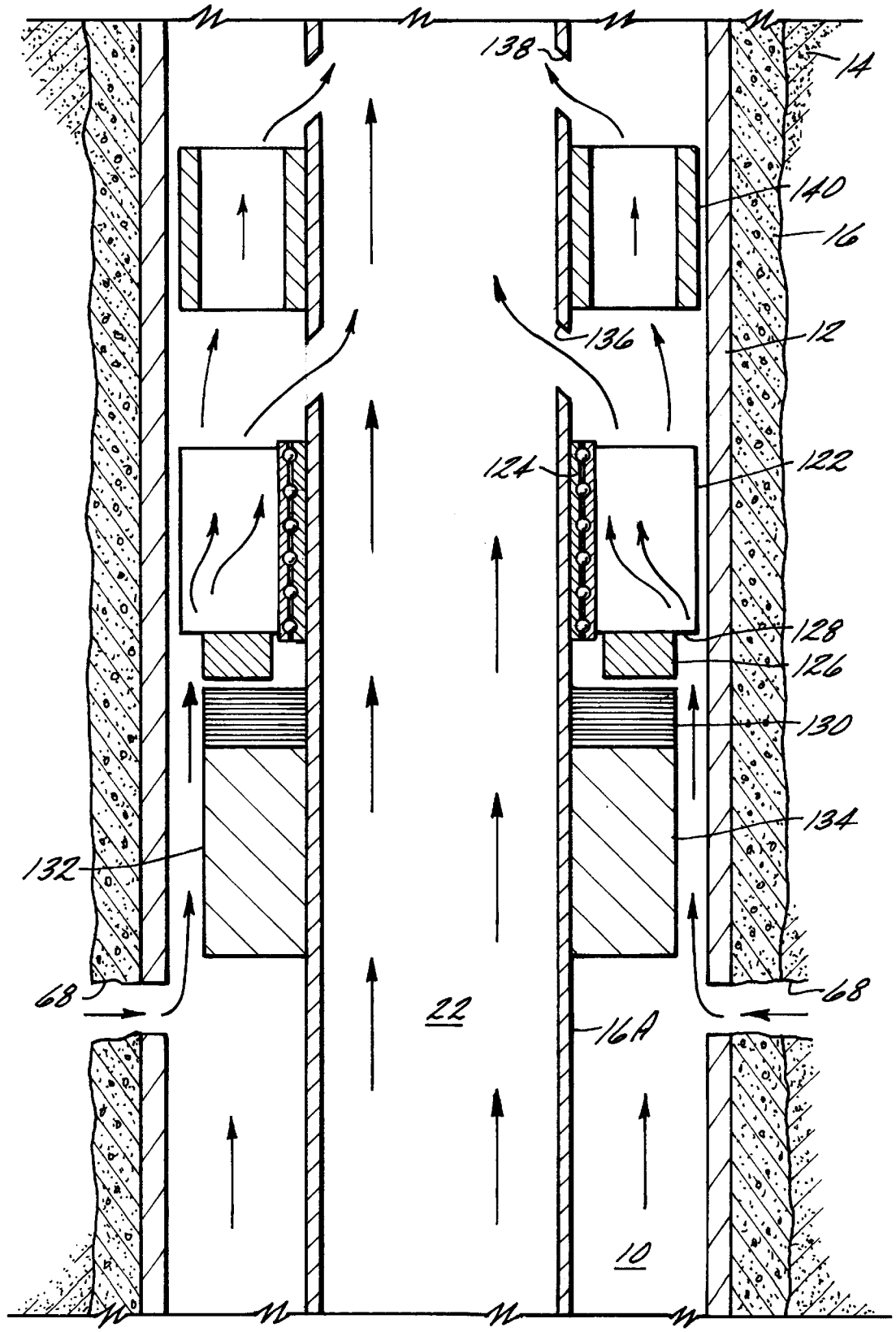
FIGS. 10A through 10C are cross-sectional elevation views depicting a power generating apparatus located in the annulus between the production tubing and well casing which consists of a magnet/coil assembly rotatably mounted on the production tubing.
Figure 10B:
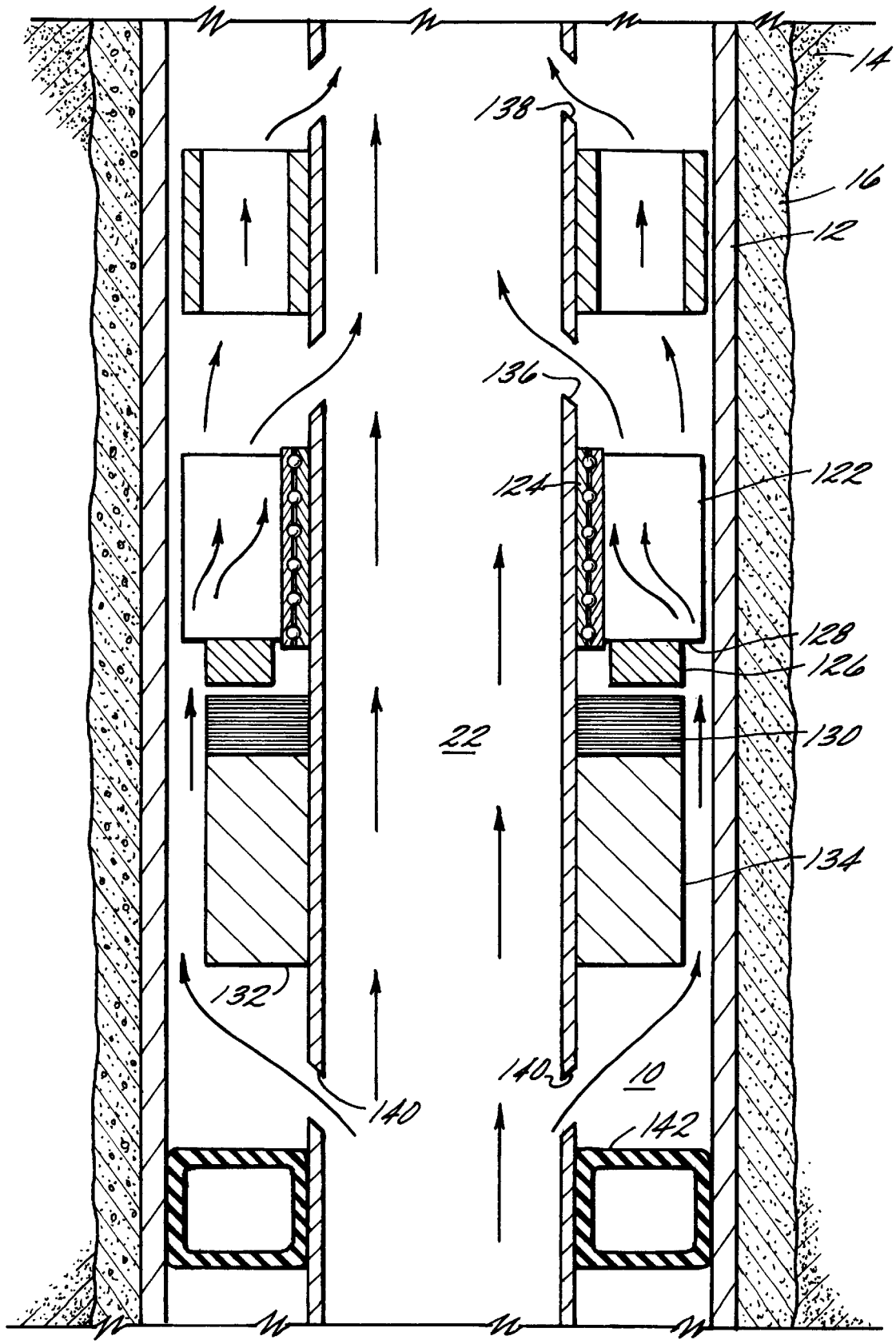
Figure 10C:
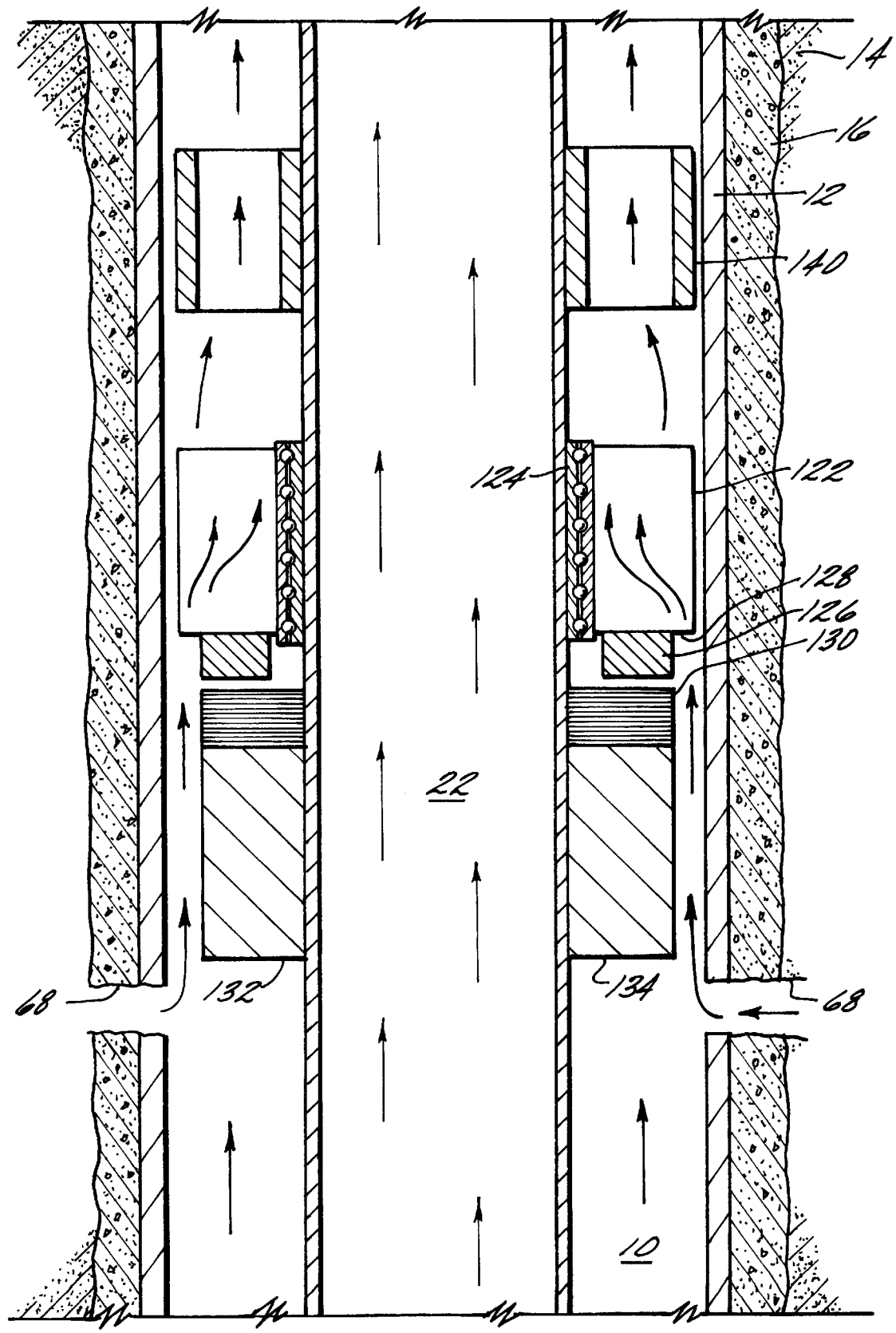

Referring now to FIGS. 10A–10C, still another embodiment of this invention wherein the electrical generating apparatus is positioned within the annulus is shown. In the embodiment of FIG. 10A–10C, a turbine 122 is rotatably mounted onto the outer surface of tubing 16 using a bearing assembly 124. One or more magnets 126 is mounted to a lower surface 128 of turbine 122. As a result, fluid impinging over turbine 122 will rotate both turbine 122 and magnet 126 about the longitudinal axis of production tubing 16. Disposed upstream and in facing relation to turbine 122 and more particularly magnet 126 is an electrical coil 130 which is rigidly mounted about the outer periphery of tubing 16. Connected to coil 130 are appropriate electronics 132 and rechargeable battery 134 of the type described in connection with aforementioned embodiments of FIGS. 3 and 4A–B. In the embodiment of FIG. 10A, production fluid travels upwardly through annulus 10 from perforations 68 formed in the formation 14. This flowing fluid impinges upon turbine 122 thereby rotating turbine 122 about the longitudinal axis of tubing 16 whereupon the magnet 126 will move relative to the coil 130 which is stationary (i.e. fixed) to tubing 16. As a result, the rotating turbine will generate electricity through the interaction between moving magnet 126 and coil 130. After the fluid has impinged upon turbine 122, the fluid will continue to flow through the annulus 10 and enter the primary passageway 22 of tubing 16 through a series of openings 136 and 138. In addition, the fluid will pass through optional centralizer 140.

FIG. 10B shows a downhole powered generation assembly which is substantially similar to FIG. 10A with the difference being that in FIG. 10B, the production fluid which initially impinges upon turbine 122 flows out of the production tubing 16 through a upstream openings 140. A packer 142 is positioned upstream of openings 140 to seal this portion of the annulus 10. After leaving the primary passageway 140, the fluid impinges upon turbine 122 and then travels upwardly and back into the primary passageway through openings 136, 138 as discussed with regard to FIG. 10A.

The FIG. 10C embodiment is again substantially identical to the FIGS. 10A and 10B embodiments with the difference being that the fluid which impinges upon turbine 122 neither flows back into the production tubing 16 (as in FIG. 10A) nor initially emanates from the production tubing 16 (FIG. 10B). Instead, the fluid flows from the annulus via an appropriate perforation 68 in the formation, impinges turbine 122, and thereafter travels upwardly through the annulus. Of course, the fluid may be directed back into the production tubing 16 at a location downstream. In the embodiments shown in FIGS. 10A–10C, the turbine 122 and magnets 126 are positioned above the electrical coil 130. It is understood that the this relationship may be reversed, that is the turbine 122 and magnets 126 may be placed below the electrical coil 130 with the same result being achieved.

Figure 11:
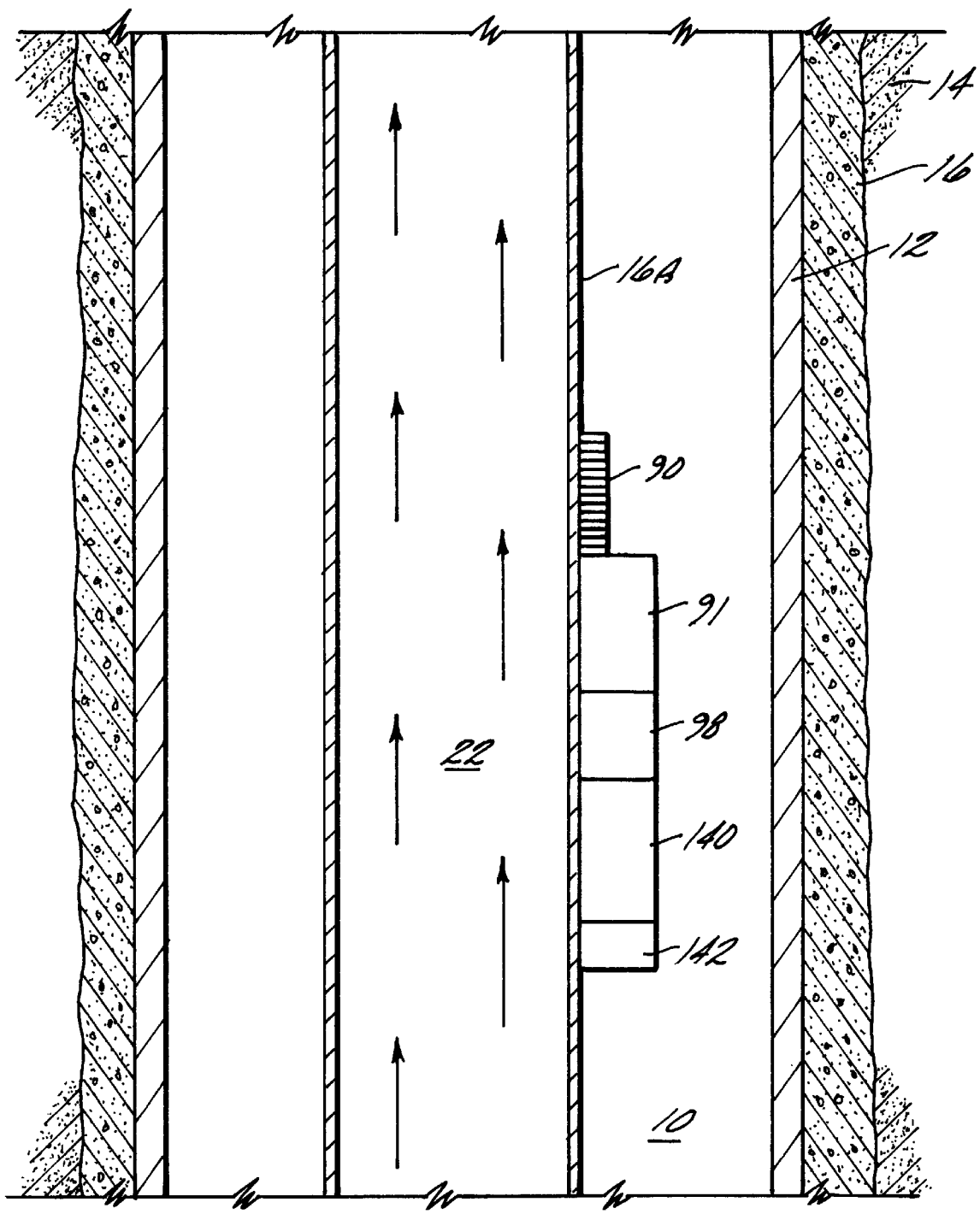
FIG. 11 is a cross-sectional elevation view of a downhole power generating apparatus consisting of a piezoelectric or magnetic assembly positioned in the annulus between the production tubing and the casing or borehole wall.

Referring now to FIG. 11, still another embodiment of this invention wherein the electrical generating apparatus is positioned in the annulus is shown. In the FIG. 11 embodiment, a piezoelectric power generating unit is shown which is substantially similar to the piezoelectric power generating unit of FIG. 5. Thus, a stack of piezoelectric elements 90 is positioned on the outer circumference of tubing 16 and is, in turn, connected to an electronics unit 91 and rechargeable battery 98 with electronics unit 91 including the power rectifier 92, voltage regulator 94 and charge/power on switch 96 of FIG. 6. FIG. 11 also depicts downhole sensors and/or gauges 140 of the type described in aforementioned U.S. application Ser. No. 08/385,992. Sensors 140 communicate with a computer/communications module 142. As with the FIG. 5 embodiment, production fluid flowing through tubing 16 causes stress and/or vibration against the tubing wall which motion is converted by the piezoelectric elements into electrical charges by the electronics unit 91.

Figure 12:
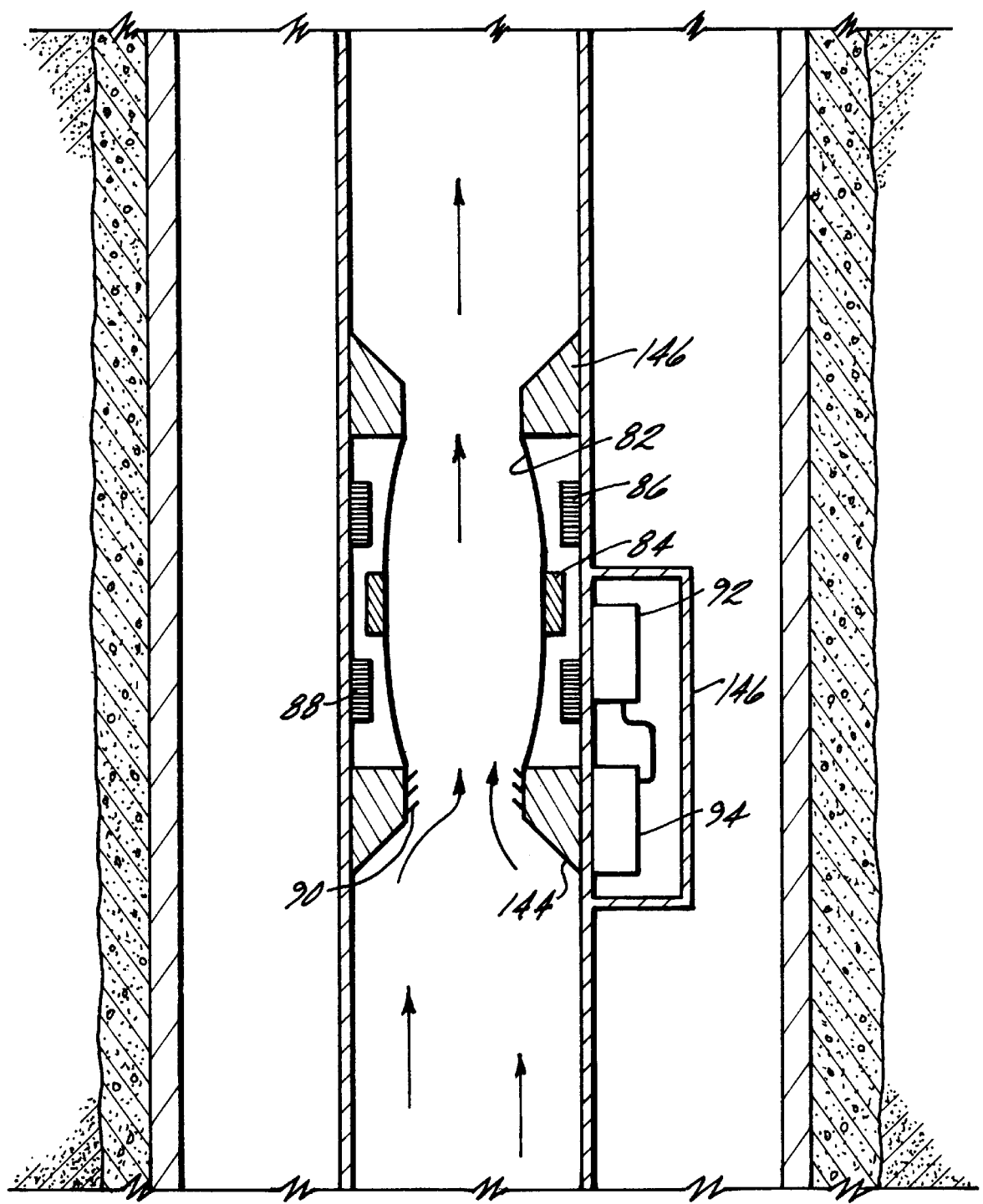
FIG. 12 is a cross-sectional elevation view of a downhole power generating apparatus, similar to the embodiments of FIGS. 4A–4B, but with the movable bladder being positioned in the production tubing's primary passage.

While an important feature of the present invention is that the primary passageway in production tubing 16 remain clear for the passage of tools and such items as coil tubing, it will be appreciated that the flexible bladder embodiments of FIGS. 4A and 4B may be positioned within the primary passageway of tubing 16 and yet still not impede or block said passageway unlike prior art devices such as the turbine shown in U.S. Pat. No. 3,342,267. For example, referring to FIG. 12, the flexible bladder 82 is shown mounted between a pair of lower mounts 144 and upper mounts 146 such that production fluid is allowed to easily pass upwardly through bladder 82 towards the surface. It will be appreciated that while the mounts 144, 146 and bladder 82 do narrow to some extent the primary passageway 22, such narrowing is minimal and still permits the passage of coil tubing or other tooling through the center of bladder 82. Of course, as in the FIGS. 4A and 4B embodiments, magnets 84 are positioned on the outside of bladder 82 and coils 86, 88 are positioned on either side of magnet 84 so as to generate electricity through the fluxuations of magnet 84 between coils 86, 88. An optional turbulence enhancer 90 is also provided. The electronics package 92 and rechargeable battery 94 are preferably positioned outside of production tubing 16 within the annulus 10 preferably within an enclosure 148 as shown in FIG. 12.

The rechargeable battery described in each and every one of the numerous embodiments of this invention represents an important feature of the present invention. In an exemplary embodiment, the battery will have the ability to operate at high temperatures (above 175° C.), have a long operating life (as much as five years), be of small size (for example sized or otherwise adapted to fit within an envelope of 1" in diameter), have the ability for continuous discharge for instrumentation in microprocessors (10 milliamperes), have the ability for periodic discharge for communications equipment (15 milliamperes per minute at 2% duty cycle), have the ability for a minimum of 100 recharging cycles from external power sources as a generator, include high energy density and excellent self-discharge characteristics. Preferably, the rechargeable battery comprises a solid lithium-metal polymer electrolyte secondary battery of the type described in the paper entitled "Large Lithium Polymer Battery Development: The Immobile Solvent Concept", M. Gauthier et al, the entire contents of which is incorporated herein by reference. Batteries of this type are also disclosed in U.S. Pat. Nos. 4,357,401; 4,578,326 and 4,758,483 all of the contents of which are incorporated herein by reference. It is believed that such lithium polymer battery cells are preferred over other battery technology such as nickel cadmium or lead acid due to the higher energy density, smaller size and better self discharge characteristics of the lithium polymer batteries. Still another rechargeable battery which is believed to be especially useful in the present invention are those rechargeable batteries available from Duracell Inc. of Bethel, Conn. which incorporate therein an integrated circuit chip for extending and/or optimizing the battery life, providing high energy density, high power and a wide temperature range for performance. Such batteries are sold by Duracell Inc. under the tradenames DR15, DR17, DR30, DR35 and DR36.

Based on the foregoing, and as shown, for example, in FIGS. 1–6 and 9–12 it will be appreciated that an important feature of this invention is a long-term power supply to be mounted on hydrocarbon production tubing downhole in a wellbore for providing electrical power to equipment mounted on the production tubing comprising (1) an electrical power generating device powered by fluid flow downhole; (2) a rechargeable battery for storing electrical power from the generating device; and (3) a charging circuit receiving electrical power as generated from the generating device and producing a charging current for delivery of power to the battery wherein the battery is recharged on a periodic basis by the charging circuit and serves as a source of power for the downhole equipment.

Although several of the apparatus for generating power are described as being powered by fluid flowing out of the well, it is also possible to generate power by forcing fluid into the well. The orientation of the power generating apparatus may be revereseed to accomodate the reverse fluid flow. This would allow power to be generated during applications such as water flood or gas lift. In addition, the power generating apparatus can be made retrievable by mounting the entire power generating apparatus in a side pocket of the well.

The downhole electrical energy generating apparatus of the present invention provides many features and advantages relative to the prior art. An important feature and advantage is that the present invention provides no obstructions within the production tubing. That is, the present invention generates electricity while simultaneously maintaining production tubing 16 obstruction free such that devices including coil tubing may be delivered through the production tubing without interruption. The ability to provide electrical power generation without obstructing the production tubing constitutes an important feature of this invention and an important advance over the prior art such as the turbo generator of U.S. Pat. No. 3,342,267 wherein the turbines cause an impassible obstruction within the production tubing.

Still other features and advantages of the present invention is the ability to generate electricity using relatively economical and environmentally friendly components. The use of a rechargeable battery allows the present invention to provide electricity both during times when production fluids are flowing as well as those times when production fluid flow has ceased.

It will be appreciated that in those embodiments which utilize a movable magnet and fixed coil, an acceptable (although less preferred) arrangement is where the magnet is fixed and the coil is movable.

It will further be appreciated that in those embodiments of this invention where fluid motion gives rise to power generation, the fluid may originate either from one or both of the production tubing or the annulus.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. An electrical energy generating apparatus for generating electricity downhole in a well, comprising:

a primary flow passageway and side passageway laterally displaced from said primary passageway; and an electrical generating device positioned, at least in part, in said side passageway, said electrical generating device adapted to generate electricity in response to fluid flowing through said side passageway.

2. The apparatus of claim 1 wherein:

said primary flow passageway and said side passageway are housed in a housing.

3. The apparatus of claim 1 wherein:

said side passageway communicates with said primary passageway to allow fluid from said primary passageway to flow into said side passageway.

4. The apparatus of claim 3 wherein:

said side passageway communicates with said primary passageway through at least one opening between said primary and side passageways.

5. The apparatus of claim 3 wherein said primary flow passageway and said side passageway are adapted for positioning in a borehole such that an annulus is defined between an inner wall of the borehole and the side passageway and wherein:

said side passageway communicates with said annulus to allow fluid from said annulus to flow into said side passageway.

6. The apparatus of claim 1 wherein said primary flow passageway and said side passageway are adapted for positioning in a borehole such that an annulus is defined between an inner wall of the borehole and the side passageway and wherein:

said side passageway communicates with said annulus to allow fluid from said annulus to flow into said side passageway.

7. The apparatus of claim 6 wherein:

said side passageway communicates with said annulus through at least one opening between said side passageway and said annulus.

8. The apparatus of claim 1 wherein said electrical generating device comprises:

at least one turbine operatively connected within said side passageway for movement in response to fluid flowing through said side passageway; and an electrical generator associated with said side passageway and operatively connected to said turbine for generating electricity in response to movement by said turbine.

9. The apparatus of claim 1 wherein said electrical generating device comprises:

a magnetic field extending across said side passageway, said magnetic field being created in response to fluid flowing through said side passageway; and an electrical energy converter associated with said side passageway for converting magnetic flux created by said magnetic field into electrical energy.

10. The apparatus of claim 9 wherein said magnetic field comprises:

a magnetic reed located within said side passageway and movable in response to flowing fluid; and a coil spaced from and associated with said reed.

11. The apparatus of claim 9 wherein said magnetic field comprises:

a flexible bladder having an interior and an exterior, said bladder being located within said side passageway, said bladder including an opening for receiving fluid to the interior thereof;

at least one magnet on the exterior of said bladder; and a coil spaced from and associated with said magnet wherein said magnet moves relative to said coil when fluid flows into said bladder.

12. The apparatus of claim 11 including:

a turbulence enhancer upstream of said bladder.

13. The apparatus of claim 1 wherein said electrical generating device comprises:

a piezoelectric device positioned within said side passageway and being responsive to movement caused by flowing fluid; and a converter for converting said signals from said piezoelectric device to electrical energy.

14. The apparatus of claim 1 including:

a flow diverter in said housing for diverting fluid from said primary flow passageway to said side passageway.

15. The apparatus of claim 1 including:

a rechargeable battery in said side passageway, said electrical generating device being operatively connected to said battery for charging said battery.

16. The apparatus of claim 15 wherein said battery comprises:

at least one polymer lithium power cell.

17. The apparatus of claim 15 wherein said battery comprises:

at least one battery which includes an integrated circuit for optimizing battery life.

18. The apparatus of claim 15 including:

an electrical device operatively connected to said battery wherein said battery provides electrical power to said electrical device.

19. The apparatus of claim 18 wherein:

said electrical device is selectively connected to either said battery or said electrical generating device.

20. The apparatus of claim 1 wherein:

at least a portion of said electrical generating device is enclosed by a fluid tight enclosure.

21. The apparatus of claim 1 including:
an electrical device operatively connected to said electrical generating device wherein said electrical generating device provides electrical power to said electrical device.

22. The apparatus of claim 21 wherein:
said electrical device comprises a computer.

23. A production well comprising:
a first section of production tubing;
a second section of production tubing; and
a downhole electrical energy generating apparatus positioned between and operatively connected to said first and second sections of production tubing, said electrical energy generating apparatus including;
 (a) a primary flow passageway and a side passageway laterally displaced from said primary passageway; and
 (b) an electrical generating device positioned at least in part in said side passageway, said electrical generating device adapted to generate electricity in response to fluid flowing through said side passageway.

24. An electrical energy generating apparatus for generating electricity downhole in a well, comprising:
a movable magnetic field extending across a selected area downhole, said movable magnetic field being created in response to the flow of fluid, said movable magnetic field comprising a magnetic reed movable in response to flowing fluid and a coil spaced from and associated with said reed; and
an electrical energy converter for converting magnetic flux created by said movable magnetic field into electrical energy.

25. An electrical energy generating apparatus for generating electricity downhole in a well, comprising:
a movable magnetic field extending across a selected area downhole, said movable magnetic field being created in response to the flow of fluid; and
an electrical energy converter converting magnetic flux created by said movable magnetic field into electrical energy wherein said movable magnetic field comprises;
a flexible bladder having an interior and an exterior, said bladder being located within said side passageway, said bladder including an opening for receiving fluid to the interior thereof;
at least one magnet on the exterior of said bladder; and
a coil spaced from and associated with said magnet wherein said magnet moves relative to said coil when fluid flows into said bladder.

26. The apparatus of claim 25 including:
a turbulence enhancer upstream of said bladder.

27. The apparatus of claim 25 including production tubing in said well for housing the flowing fluid and wherein:
said flexible bladder is positioned within said production tubing and is axially aligned with said production tubing.

28. An electrical generating apparatus for generating electricity downhole in a well, comprising:
a movable magnetic field extending across a selected area downhole, said magnetic field being created in response to pressure pulses traveling through a fluid pathway; and
an electrical energy converter for converting magnetic flux created by said movable magnetic field into electrical energy.

29. The apparatus of claim 28 wherein said electrical generating apparatus comprises:
a spring actuated magnet; and
a coil spaced from and magnetically communicating with said spring actuated magnet wherein said pressure pulses cause said spring actuated magnet to move relative to said coil.

30. The apparatus of claim 29 including tubing in said well for housing fluid and wherein said pressure pulses travel through said tubing.

31. The apparatus of claim 30 wherein:
said spring actuated magnet and coil are laterally offset from said tubing.

32. The apparatus of claim 28 including tubing in said well for housing fluid and wherein said pressure pulses travel through said tubing.

33. The apparatus of claim 28 including tubing in said well for housing fluid and wherein:
said pressure pulses travel through a conduit having fluid therein which is laterally offset from said tubing.

34. An electrical generating apparatus for generating electricity downhole in a well, comprising:
a piston positioned in a selected area downhole, said piston being moved in a first direction in response to pressure pulses traveling through a fluid pathway; and
an electrical energy generator coupled to said piston for generating electrical energy in response to motion by said piston.

35. The apparatus of claim 34 further comprising:
a spring connected to said piston, said spring moving said piston in a second direction opposite to said first direction.

36. The apparatus of claim 35 wherein said electrical energy generator comprises:
a magnetic coil; and
a generator armature which rotates within said magnetic coil to generate said electrical energy.

37. The apparatus of claim 36 further comprising a drive shaft connected to said piston and said generator armature, said drive shaft rotating said generator armature when said piston moves in said first direction and said second direction.

38. The apparatus of claim 34 including tubing in said well for housing fluid and wherein:
said pressure pulses travel through a conduit having fluid therein which is laterally offset from said tubing.

39. An electrical energy generating apparatus for generating electricity downhole in a well, comprising:
a primary flow passageway having an interior and an exterior; and
an electrical generating device positioned on said exterior of said primary flow passageway, said electrical generating device adapted to generate electricity in response to fluid flowing along said exterior of said primary passageway.

40. The apparatus of claim 39 wherein said electrical generating device comprises:
at least one turbine being operative in response to said flowing fluid; and
an electrical generator operatively connected to said turbine for generating electricity in response to movement by said turbine.

41. The apparatus of claim 39 wherein said electrical generating apparatus comprises:
a rotating member for rotating about the exterior of said primary flow passageway in alignment with the longitudinal axis of said primary flow passageway;

at least one magnet mounted on said rotating member and being rotatable with said rotating member; and a coil positioned about the exterior of the primary flow passageway, said coil being spaced from and associated with said magnet wherein said magnet moves relative to said coil when fluid flows through said turbine.

42. The apparatus of claim 41 wherein said primary flow passageway comprises tubing and the exterior of said primary flow passageway comprises an annulus and wherein:

said fluid flows through said turbine and is directed into said tubing downstream of said turbine.

43. The apparatus of claim 42 wherein:

said fluid is directed from the interior of said tubing to said annulus upstream of said turbine.

44. An electrical generating apparatus for generating electricity downhole in a well, comprising:

a primary flow passageway and a side passageway laterally displaced from said primary flow passageway; and an electrical generating device positioned in said side passageway, said electrical generating device adapted to generate electricity in response to fluid flowing downhole in the well.

45. A production well comprising:

a section of production tubing having an interior flow passage and an exterior;

a piezoelectric device positioned on said exterior of said tubing and being responsive to movement caused by flowing fluid; and a converter for converting signals from said piezoelectric device to electrical energy.

46. The well of claim 45 wherein said converter includes:

a power rectifier operatively connected to said piezoelectric device;

a voltage regulator for receiving rectified signals from said power rectifier;

at least one rechargeable battery; and a switch operatively connected between said voltage regulator and said battery.

47. A production well comprising:

a section of production tubing;

a downhole power generator associated with said production tubing; and at least one rechargeable battery operatively connected to said power generator.

48. The well of claim 47 wherein:

said battery comprises a lithium polymer battery.

49. The well of claim 48 wherein:

said battery includes an integrated circuit for optimizing performance.

50. The well of claim 47 including:

at least two rechargeable batteries wherein a first of said batteries is recharged while a second of said batteries is being used to provide power to a device.

51. A long-term power supply to be mounted on hydrocarbon production tubing downhole in a wellbore for providing electrical power to equipment mounted on the production tubing comprising:

an electrical power generating device powered by fluid flow downhole;

a rechargeable battery for storing electrical power from the generating device; and a charging circuit receiving electrical power as generated from the generating device and producing a charging current for delivery of power to the battery;

wherein the battery is recharged on a periodic basis by the charging circuit and serves as a source of power for the downhole equipment.

52. The well of claim 51 wherein:

said battery comprises a lithium polymer battery.

53. The well of claim 52 wherein:

said battery includes an integrated circuit for optimizing performance.

54. The well of claim 51 including:

at least two rechargeable batteries wherein a first of said batteries is recharged while a second of said batteries is being used to provide power to a device.

* * * * *

UNITED STATES PATENT AND TRADEMARK OFFICE
CERTIFICATE OF CORRECTION

PATENT NO. : 5,839,508
DATED : November 24, 1998
INVENTOR(S) : Paulo Tubel et al.

It is certified that error appears in the above-indentified patent and that said Letters Patent is hereby corrected as shown below:

Column 7, Line 48 delete "an" and insert therefor --a--
Column 8, Line 37 insert --72-- between "reed" and "rotates"
Column 13, Line 2 delete "a" between "through" and "upstream"
Column 13, Line 3 delete "upstream" and insert therfor-- downstream--
Column 13, Line 5 delete "140" and insert therefor --22--
Column 13, Line 21 delete "the" between "that" and "this"

Signed and Sealed this

Tenth Day of April, 2001

Attest:

NICHOLAS P. GODICI

*Attesting Officer*  *Acting Director of the United States Patent and Trademark Office*